United States Patent [19]

Hunter et al.

[11] Patent Number: 4,751,697
[45] Date of Patent: Jun. 14, 1988

[54] DISTRIBUTED PACKET SWITCHING SYTEM

[75] Inventors: Paul D. Hunter, Naperville; James M. Johnson, Jr., Glen Ellyn; Christopher G. McHarg, Arlington Heights; David A. Pierce; Thomas J. J. Starr, both of Wheaton; Benjamin C. Widrevitz, Downers Grove; Ralph A. Wilson, III, Wheaton; Meyer J. Zola, Oak Park, all of Ill.

[73] Assignee: American Telephone and Telegraph Company, AT&T Bell Laboratories, Murray Hill, N.J.

[21] Appl. No.: 904,962

[22] Filed: Sep. 5, 1986

[51] Int. Cl.[4] .......................... H04Q 11/04; H04J 3/00
[52] U.S. Cl. ........................................ 370/60; 370/86; 370/68.1
[58] Field of Search ................... 370/60, 94, 85, 110.1, 370/80, 86, 68.1; 340/825.5

[56] References Cited

U.S. PATENT DOCUMENTS

| | | | |
|---|---|---|---|
| 4,322,843 | 3/1982 | Beuscher et al. | 370/60 |
| 4,408,323 | 10/1983 | Montgomery | 370/60 |
| 4,484,324 | 11/1984 | Orsic | 370/58 |
| 4,491,945 | 1/1985 | Turner | 370/60 |
| 4,524,440 | 6/1985 | Orsic | 370/54 |
| 4,550,397 | 10/1985 | Turner | 370/60 |
| 4,592,048 | 5/1986 | Beckner et al. | 370/60 |
| 4,596,010 | 6/1986 | Beckner et al. | 370/60 |

OTHER PUBLICATIONS

"Fundamental Advantages of System 12", Electrical Communication, R. VanMalderen, vol. 59, No. 1/2—1985, pp. 20-28.
"Dual Switch Port Structure", Electrical Communication, vol. 59, No. 1/2—1985, pp. 54-59, W. Frank.
Dierckx, R., Taeymans, J. R., "System 12 ISDN Line Circuit", Electrical Communication, vol. 59, No. 1/2—1985, pp. 105-111.
Chalet, A., Drignath, R., "System 12 Data Module Architecture Including Packet Operation", Electrical Communication, vol. 59, No. 1/2—1985, pp. 112-119.

Primary Examiner—Douglas W. Olms
Assistant Examiner—Frank M. Scutch, III
Attorney, Agent, or Firm—Ross T. Watland

[57] ABSTRACT

A switching system including a number of switching modules each having a plurality of access ports. Incoming and outgoing packet channels are extended between each switching module and an inter-module packet switch. Each switching module includes a packet switching unit that transmits user information packets, received from the access ports, via the incoming packet channel to the inter-module packet switch, and switches user information packets, received via the outgoing packet channel from the inter-module packet switch, to the access ports for inter-module packet-switched communication. The intermodule packet switch concurrently packet switches user information packets, received on a number of the incoming packet channels, via multiple independent paths to a number of the outgoing packet channels.

27 Claims, 17 Drawing Sheets

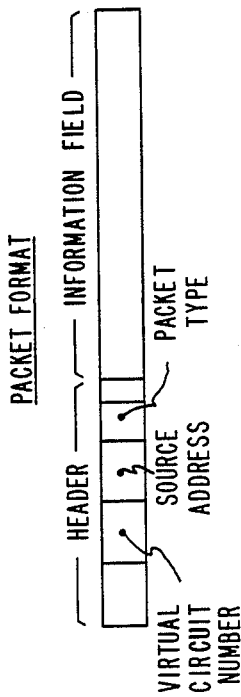
FIG.15
VIRTUAL PBX GROUP
(1005,1006,1055,1056)
FIG.16
PACKET FORMAT
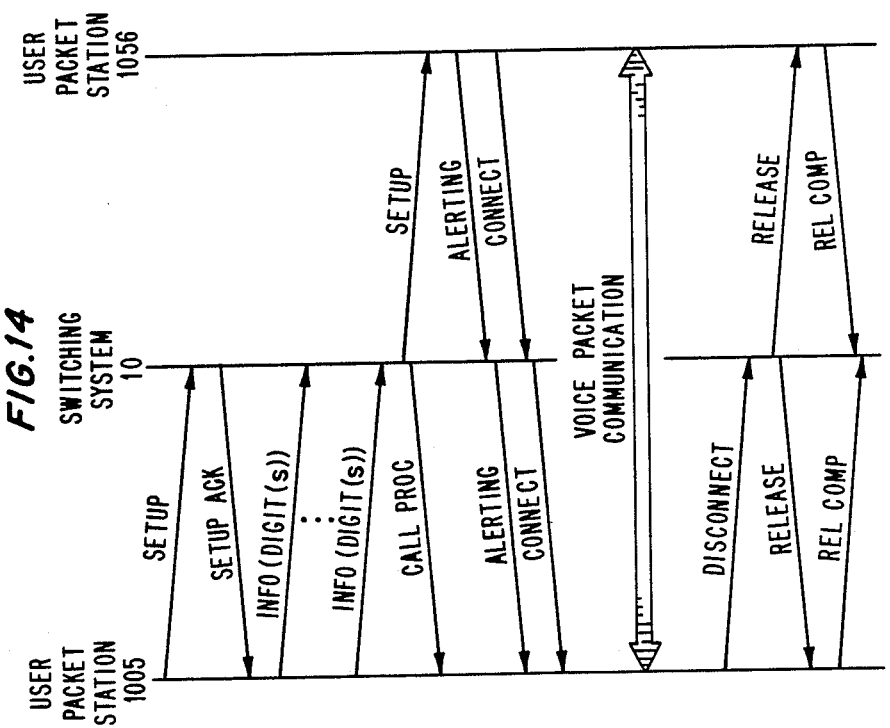
FIG.14

DISTRIBUTED PACKET SWITCHING SYTEM

CROSS-REFERENCE TO RELATED APPLICATIONS

This application is related to the following applications:

P. D. Hunter, W. W. Parker and B. C. Widrevitz application Ser. No. 904,885 filed Sept. 5, 1986; "Virtual PBX Call Processing Method", C. G. McHarg and D. A. Pierce application Ser. No. 904,961 filed Sept. 5, 1986; "Packet Switch", D. L. DeBruler, E. H. Hafer, T. L. Hiller, D. A. Kimber, J. M. Johnson, C. G. McHarg, S. W. Pector and D. A. Pierce application Ser. No. 904,929, filed Sept. 5, 1986, "Control Information Communication Arrangement for a Distributed Control Switching System".

The related applications are filed concurrently herewith and are assignee of the present invention.

TECHNICAL FIELD

This invention relates to switching systems and, more particularly, to high capacity switching systems that switch multiple types of information received in packetized form.

BACKGROUND OF THE INVENTION

Distributed packet switching systems provide customers with packet switching service on a modular basis allowing incremental growth in the packet switching capacity of the system as the number of users increases. One example of a distributed packet switching architecture is the arrangement disclosed in U.S. Pat. No. 4,596,010 issued to M. W. Beckner et al. on June 17, 1986. In the exemplary embodiment of the Beckner patent, a number of switching modules are interconnected by a central time-multiplexed switch. The modules include both packet switching and circuit switching units for intra-module communication. The central time-multiplexed switch interconnects the module circuit switching units for inter-module circuit-switched communication. Predetermined channels of the central switch otherwise available for carrying inter-module circuit-switched traffic, are permanently established between each pair of module packet switching units for inter-module packet communication. Although the Beckner embodiment advantageously provides packet switching service in a manner allowing incremental growth, particularly when a relatively small number of switching modules each serve users having a high community of interest, the limitation on the inter-module packet traffic capacity imposed by the permanent pairwise assignment of central switch channels substantially limits the packet switching performance of the system, particularly as the number of switching modules and the amount of inter-module packet traffic both increase. The limitation becomes even more serious when the techniques of packet communication are extended beyond digital data communications to other types of information transfer, e.g., voice and image communication.

In view of the foregoing, a recognized problem in the art is the restricted packet traffic capacity between a limited number of switching modules resulting from the permanent pairwise assignment of central switch channels in known distributed packet switching systems.

SUMMARY OF THE INVENTION

The foregoing problem is solved and a technical advance is achieved in accordance with the principles of the invention in an exemplary packet switching system for switching, by way of example, user voice, data, and image information packets from distributed packet switching units advantageously on a concurrent basis by means of a novel arrangement of an inter-module packet switch. The illustrative packet switching system comprises a number of switching modules each including a packet switching unit, where the packet switching units of different switching modules communicate rapidly by transmitting user information packets via high speed incoming packet channels to an inter-module packet switch that concurrently packet switches the user information packets, advantageously via independent paths to high speed outgoing packet channels for transmission to destination module packet switching units. The capability of the inter-module packet switch to concurrently convey multiple packet streams between different module packet switching units greatly increases the system inter-module packet traffic capacity, and a greater number of switching modules are served by the system than was practicable in prior art arrangements.

A switching system in accordance with the invention includes a number of switching modules each having a plurality of access ports. Incoming and outgoing packet channels are extended between each switching module and an inter-module packet switch. Each of the switching modules includes a packet switching unit that switches user information packets among the access ports and between the access ports and the inter-module packet switch via the incoming and outgoing packet channels. The inter-module packet switch concurrently packet switches user information packets, received on a number of the incoming packet channels, via multiple independent paths to a number of the outgoing packet channels.

In the exemplary embodiment described herein, each switching module includes a packet line unit that statistically multiplexes packets, received from ones of the access ports, onto at least one incoming data bus. The module packet switching unit provides packet-switched communication channels from the incoming data bus to at least one outgoing data bus for intra-module packet-switched communication. The module packet switching unit further provides packet-switched communication channels from the incoming data bus to the incoming packet channel to the inter-module packet switch, and from the outgoing packet channel from the inter-module packet switch to at least one outgoing data bus for inter-module packetswitched communication. The packet line unit selectively transmits packets received on at least one outgoing data bus to ones of the access ports. A packet network termination interfaces a number of user stations to one of the access ports.

In the exemplary embodiment, the module packet switching units each have a number of packet switching nodes, referred to as such since they accumulate received data bits into packets and subsequently transmit the packets on toward their destinations. A predetermined one of the nodes is coupled to the incoming and outgoing packet channels to and from the inter-module packet switch and certain ones of the nodes are connected to the access ports. The module packet switching unit further includes a packet interconnect to interconnect the nodes to provide packet-switched communication channels among the access ports of the switching module and between the access ports and the predetermined node.

The packet switching nodes transmit request signals to the packet interconnect. The packet interconnect generates selection signals each defining one of the nodes and responds to a request signal from a given node and to a generated selection signal defining the given node, by transmitting a clear signal to the given node. The given node responds to the clear signal from the packet interconnect by transmitting a packet thereto. A sequencing arrangement sequentially enables each of the nodes to transmit information to the packet interconnect.

The inter-module packet switch includes a number of packet buffers, each for storing packets received from at least one of the incoming packet channels, and further includes a number of selectors, each associated with at least one of the outgoing packet channels for selectively connecting any of the packet buffers to an outgoing packet channel. A control ring responds to packets stored in the packet buffers by controlling the selective connections made by the selectors, based on headers included in the stored packets. The control ring also responds to the stored packets by selectively effecting the transmission of the stored packets from the packet buffers.

In an alternative embodiment, the packet interconnect in each switching module comprises a banyan interconnection network.

BRIEF DESCRIPTION OF THE DRAWING

A more complete understanding of the present invention may be obtained by a consideration of the following description when read in conjunction with the drawing in which:

FIG. 14 is a signaling sequence diagram for the setup of a packet-switched call in the system of FIGS. 2 and 3;

FIG. 15 is a table defining the permanent assignment of virtual circuits between different pairs of user stations in a virtual PBX group implemented using the system of FIGS. 2 and 3;

FIG. 16 shows, portions of the packet format used by members of the virtual PBX group of FIG. 15;

GENERAL DESCRIPTION

Figure 1:
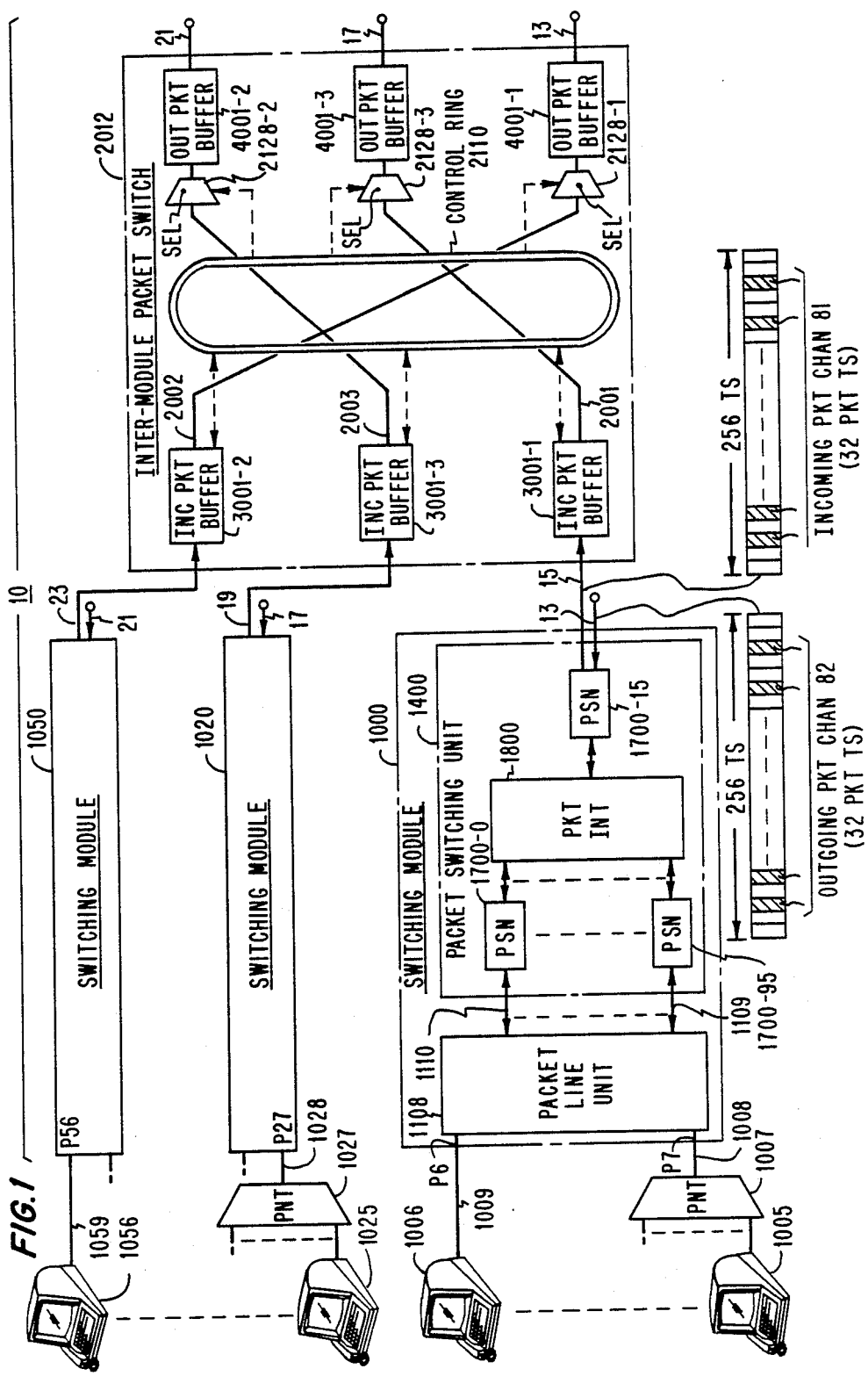
FIG. 1 is a block diagram of an exemplary embodiment of a distributed packet switching system illustrating the principles of the present invention.
Figure 2:
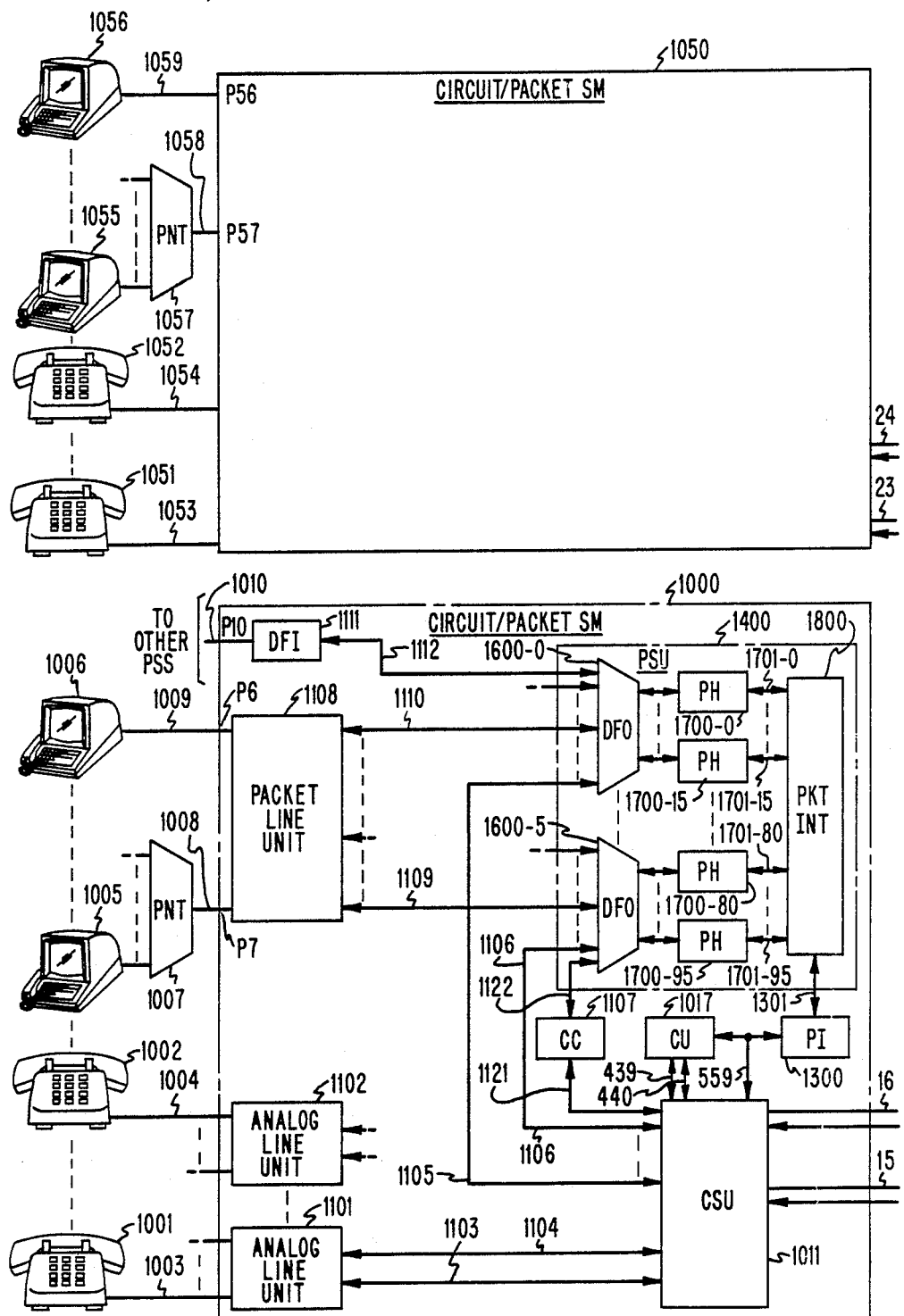
FIGS. 2 and 3, when arranged in accordance with FIG. 12, present a more detailed diagram of the system of FIG. 1.
Figure 3:
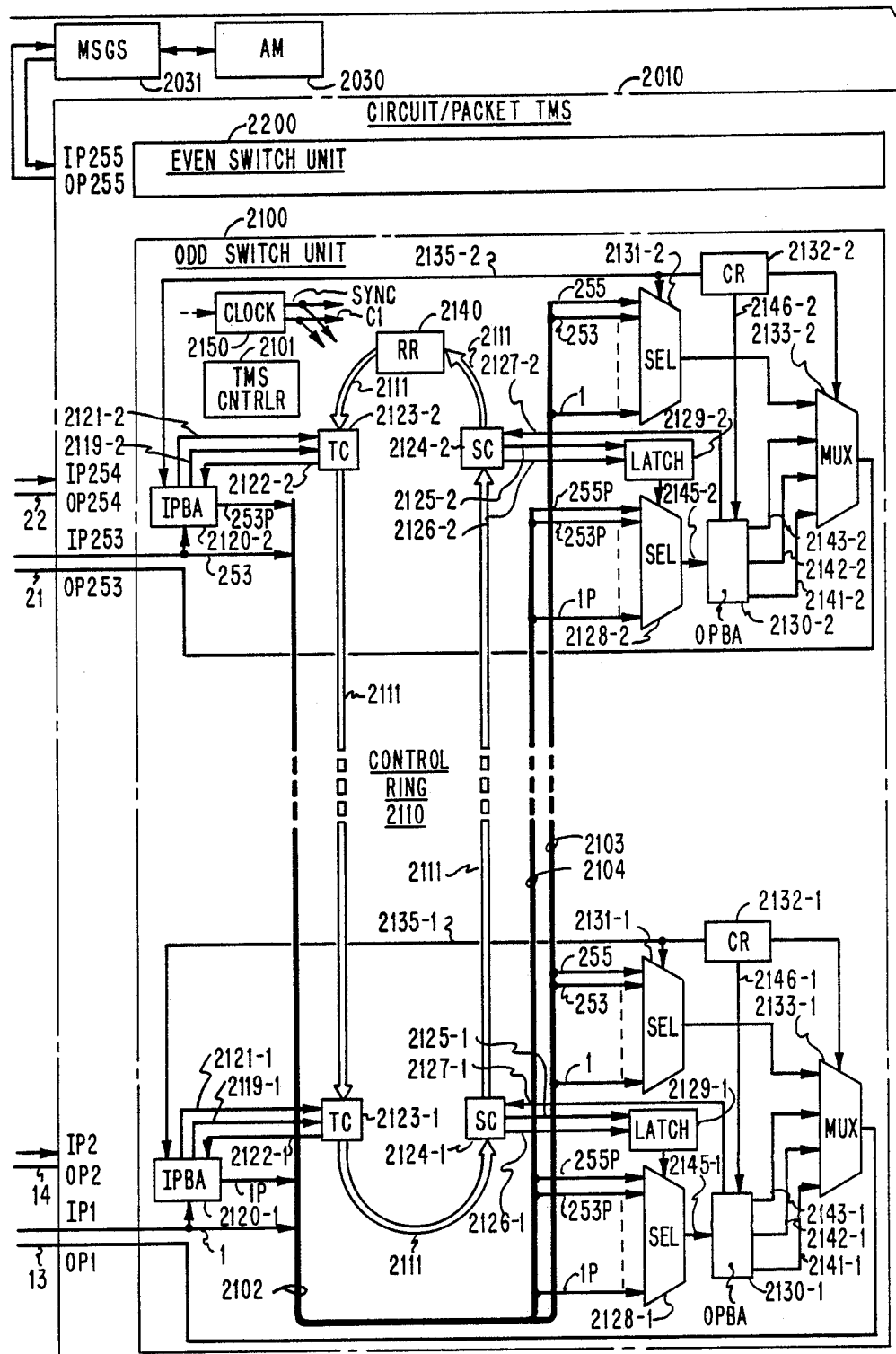
Figure 12:
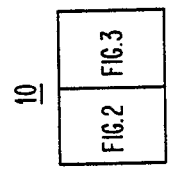

FIG. 1 is a block diagram of an exemplary switching system 10 illustrating the principles of the present invention. FIGS. 2 and 3, when arranged in accordance with FIG. 12, present a more detailed diagram of system 10. Switching system 10 (FIG. 1) includes a plurality of switching modules, e.g., 1000, 1020 and 1050, to provide packet switching service to a plurality of user packet stations, e.g., 1005, 1006, 1025, 1056. Information from user packet stations is conveyed to switching system 10 via 144 kilobits per second packet digital subscriber lines, e.g., 1008, 1009, 1028 and 1059. Packet network terminations, e.g., 1007 and 1027, are used to interface a number of user packet stations to a single packet digital subscriber line. Each packet digital subscriber line is connected to a switching module at an access port, e.g., access ports P6, P7, P27, and P56. Access ports can also be used to connect switching modules to trunks to other packet systems.

Incoming packet channel 81 and outgoing packet channel 82 are extended between switching module 1000 and an inter-module packet switch 2012. Switching module 1000 includes packet switching unit 1400 that provides packet-switched communication channels among its associated user packet stations, e.g., 1005 and 1006, for intra-module packet-switched communication. Packet switching unit 1400 also transmits user information packets received from its associated user packet stations, via incoming packet channel 81 to inter-module packet switch 2012, and switches user information packets received via outgoing packet channel 82 from inter-module packet switch 2012, to its associated user packet stations for inter-module packet-switched communication.

Switching module 1000 further includes a packet line unit 1108 that statistically multiplexes packets received on packet digital subscriber lines, e.g., 1008 and 1009, onto a number of bidirectional data buses, e.g., 1109 and 1110. Packet switching unit 1400 provides packet-switched communication channels from the incoming portion of the bidirectional data buses to the outgoing portion of the buses for intra-module packet-switched communication. Packet switching unit further provides packet-switched communication channels from the incoming portion of the data buses to incoming packet channel 81, and from outgoing packet channel 82 to the outgoing portion of the data buses for inter-module packet-switched communication. Packet line unit 1108 selectively transmits packets received on the outgoing portion of the data buses to user packet stations via the packet digital subscriber lines.

Packet switching unit 1400 includes a number of packet switching nodes, e.g., 1700-0, 1700-15 and 1700-95, referred to as such since they accumulate received data bits into packets and subsequently transmit the packets on toward their destinations. A predetermined one of the nodes, 1700-15, is coupled to the incoming and outgoing packet channels 81 and 82, and others of the nodes, e.g., 1700-0 and 1700-95, are connectible to the user packet stations served by switching module 1000. Packet switching unit 1400 further includes a packet interconnect 1800 to interconnect the nodes to provide packet-switched communication channels between the user packet stations of switching module 1000 and between those user packet stations and the predetermined node 1700-15.

The packet switching nodes transmit request signals to packet interconnect 1800. Packet interconnect 1800 generates selection signals each defining one of the nodes and responds to a request signal from a given node and to a generated selection signal defining the given node, by transmitting a clear signal to the given node. The given node responds to the clear signal from packet interconnect 1800 by transmitting a packet thereto. Packet interconnect 1800 sequentially enables each of the nodes to transmit information to packet interconnect 1800.

Each switching module, e.g., 1000, is connected to inter-module packet switch 2012 by a 256 time slot, incoming time-multiplexed link 15 and a 256 time slot, outgoing time-multiplexed link 13. Of the 256 time slots on a link, 32 are reserved to form a packet channel. For example, 32 packet time slots on link 15 form the incoming packet channel 81. On link 13, 32 packet time slots form the outgoing packet channel 82. The remaining time slots on the links are either used to convey circuit-switched information or to form other packet channels. Packets received on the incoming packet channels are stored in incoming packet buffers in inter-module packet switch 2012. For example, packets received on the incoming packet channels on links 15, 19 and 23 are stored by incoming packet buffers 3001-1, 3001-3, and 3001-2, respectively. A plurality of selectors, e.g., 2128-1, 2128-3, and 2128-2, are each associated with one of the outgoing packet channels and are each capable of connecting any of the incoming packet buffers to the associated outgoing packet channel. Outgoing packet buffers are interposed between the selectors and the outgoing packet channels. For example, outgoing packet buffers 4001-1, 4001-3, and 4001-2 are interposed between selectors 2128-1, 2128-3, and 2128-2 and the outgoing packet channels on links 13, 17, and 21, respectively. Although not shown in FIG. 1, the outgoing packet buffer output terminals are connected to the switching modules by the outgoing links, e.g., 13, 17 and 21. A control ring 2110 controls the selective connections made by the selectors and also effects the selective transmission of stored packets from the incoming packet buffers. Significantly, inter-module packet switch 2012 concurrently packet switches inter-module packets via independent paths to outgoing packet channels. For the example shown in FIG. 1, packets stored in incoming packet buffers 3001-1, 3001-3, and 3001-2 are concurrently packet switched via independent paths 2001, 2003, and 2002 to selectors 2128-3, 2128-2, and 2128-1, respectively.

In the more detailed diagram of switching system 10 shown in FIGS. 2 and 3, the packet switching nodes of FIG. 1 are referred to as protocol handlers. Inter-module packet switch 2012 is not separately shown in switching system 10 of FIGS. 2 and 3, but rather is shown integrated into a circuit/packet time-multiplexed switch 2010. The predetermined packet switching node 1700-15 of FIG. 1 corresponds to protocol handler 1700-15 in FIG. 2. In FIG. 2, protocol handler 1700-15 is coupled to the incoming and outgoing packet channels via predetermined channels of a circuit switching unit 1011. Rather than having only a single incoming packet channel from switching module 1000 and a single outgoing packet channel to switching module 1000 as in FIG. 1, time-multiplexed switch 2010 receives three incoming packe channels on incoming link 15 and three incoming packet channels on incoming link 16, and transmits three outgoing packet channels on outgoing link 13 and three outgoing packet channels on outgoing link 14. Further each of the incoming packet buffers of FIG. 1 is included in an incoming packet buffer arrangement of FIG. 3 comprising three incoming packet buffers and each of the outgoing packet buffers of FIG. 1 is included in an outgoing packet buffer arrangement of FIG. 3 comprising three outgoing packet buffers. In addition, only two switching modules are explicitly shown in FIG. 2 rather than three.

Figure 20:
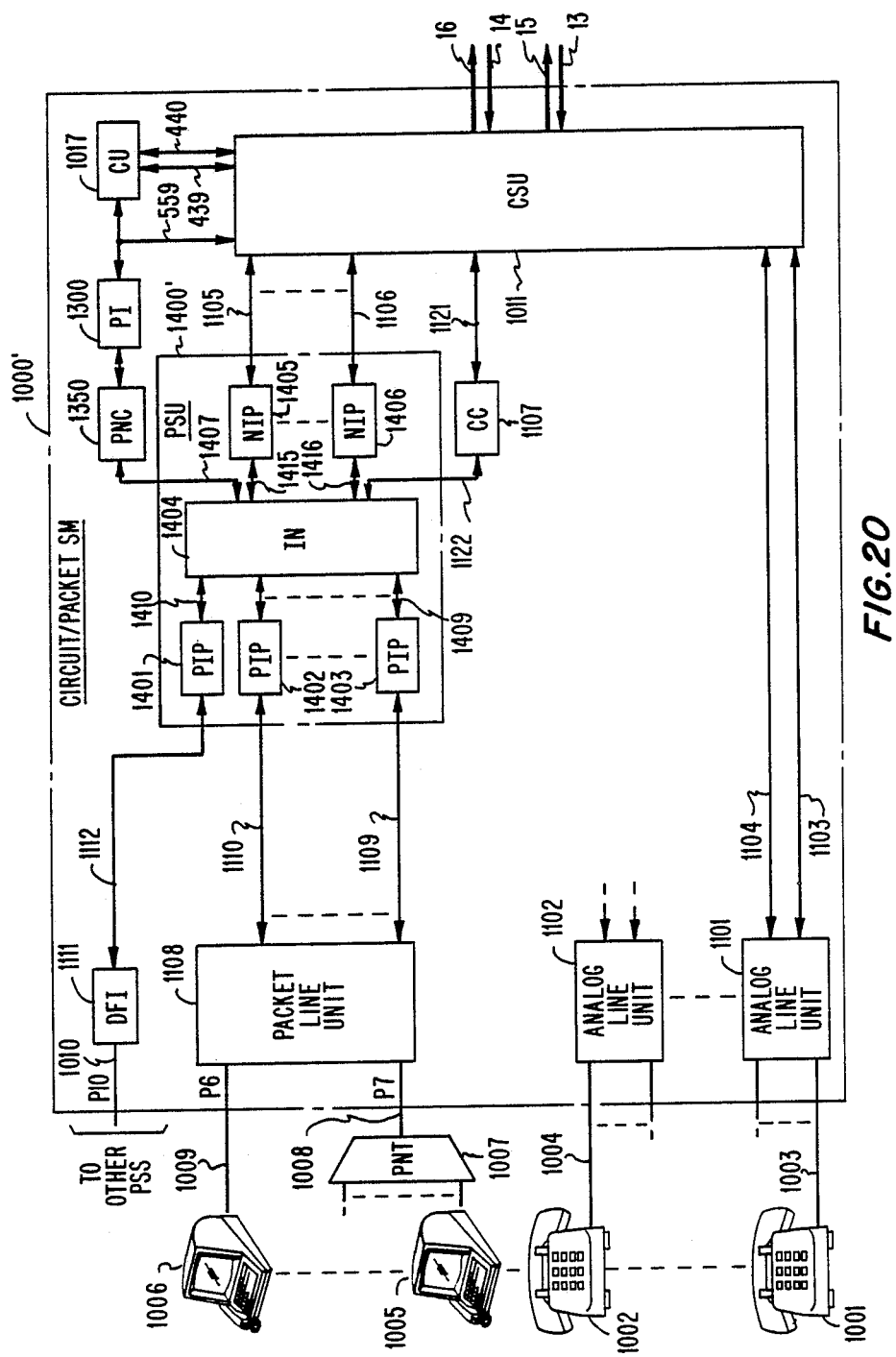
FIG. 20 is a diagram of a switching module used in an alternate embodiment of the system shown in FIGS. 2 and 3.

In the alternate embodiment shown in FIG. 20, the peripheral interface ports correspond to the packet switching nodes 1700-0 and 1700-95 of FIG. 1, the network interface ports each correspond to a packet switching node such as node 1700-15 of FIG. 1, and the banyan interconnection network 1404 corresponds to packet interconnect 1800 of FIG. 1.

DETAILED DESCRIPTION

FIGS. 2 and 3, when arranged in accordance with FIG. 12, present a block diagram of the exemplary switching system 10. Switching system 10 also includes a plurality of circuit/packet switching modules, e.g., 1000 and 1050. Switching system 10 provides circuit switching service to a plurality of analog stations, e.g., 1001, 1002, 1051 and 1052, via conventional analog lines, e.g., 1003, 1004, 1053 and 1054. Switching system 10 also provides packet switching service to a plurality of user packet stations, e.g., 1005, 1006, 1055, and 1056, via 144 kilobits per second packet digital subscriber lines (PDSLs), e.g., 1008, 1009, 1058, and 1059. PDSLs 1008, 1009, 1058 and 1059 are interfaced to access ports P6 and P7 of switching module 1000 and access ports P56 and P57 of switching module 1050. Switching system 10 also provides packet switching connectivity to other packet switching systems, e.g., private branch exchanges or central office systems, via a 1.544 megabits per second high speed link 1010 connected at access port P10.

Each user packet station, e.g., 1005, includes a low bit rate voice codec (coder/decoder) with silence suppression and packetizing functions. Any of a number of low bit rate voice coding techniques can be used, for example, 32 kilobits per second Adaptive Differential Pulse Code Modulation (ADPCM) or 9.6 kilobits per second Multi-Pulse Linear Predictive Coding (MPLPC). In addition to the coding, the data rate is further reduced by silence suppression. Voice packets are sent only while voice energy is present. No voice packets are sent while a speaker quietly listens to the other party, or while the speaker is between words or syllables. The coded voice is formed into packets. For ADPCM coding, voice packets are approximately 70 bytes including the header. Each packet represents approximately 16 milliseconds of speech. Each voice packet includes a time stamp which is used by the receiving end to compensate for the variable network delay.

In addition to voice coding, each user packet station uses low bit rate video coding for still-frame or low-resolution real time image transfer. The user packet station also conveys low-speed or high-speed data. All information, including signaling, is carried in packets. The user packet station statistically multiplexes the information from its various sources.

As shown in FIG. 2, some user packet stations, e.g., 1006 and 1056, are connected directly via PDSLs to switching system 10. However, a number of user packet stations, e.g., five stations, can share a single PDSL. A packet network termination (PNT) provides multiple station interface ports for point-to-point connection to user packet stations to provide such shared access to PDSLs. For example, PNT 1007 and PNT 1057 provide station interface ports from a number of user packet stations, e.g., station 1005 and station 1055, to PDSL 1008 and PDSL 1058, respectively. A PNT, e.g., 1007, includes a plurality of buffers (not shown) to store packets received from each associated user packet station. PNT 1007 statistically multiplexes the packets onto PDSL 1008. In the reverse direction PNT 1007 receives the 144 kilobits per second packet stream from PDSL 1008 and broadcasts all received packets to the associated user packet stations. Each station determines whether it is the intended destination of a received packet based on the packet header.

In the present exemplary embodiment, information is conveyed on a PDSL using one pair of wires for each direction of transmission. PDSL 1008, for example, transmits a serial bit stream at the rate of 192 kilobits per second including the above-mentioned 144 kilobits per second packet stream and which further includes 48 kilobits per second used for a number of functions including framing, DC balancing, control and maintenance. The physical level characteristics of a PDSL are the same as those specified by the International Telegraph and Telephone Consultative Committee (CCITT) as the T-interface. The use of T-interface access is only exemplary. The invention is equally applicable to systems using other access methods including lines having a variety of bit rates.

In switching module 1000, the analog lines, e.g., lines 1003 and 1004, are terminated by analog line units, e.g., 1101 and 1102, which perform the conventional functions, e.g., supervision, ringing, etc., as required to interface with analog stations, including the digitization of the incoming analog signals and the transmission of the digital information to a circuit switching unit 1011 via a pair of 32-channel time-multiplexed data buses. As shown in FIG. 2, analog line unit 1101 is connected to circuit switching unit 1011 via the 32-channel data buses 1103 and 1104.

Figure 4:
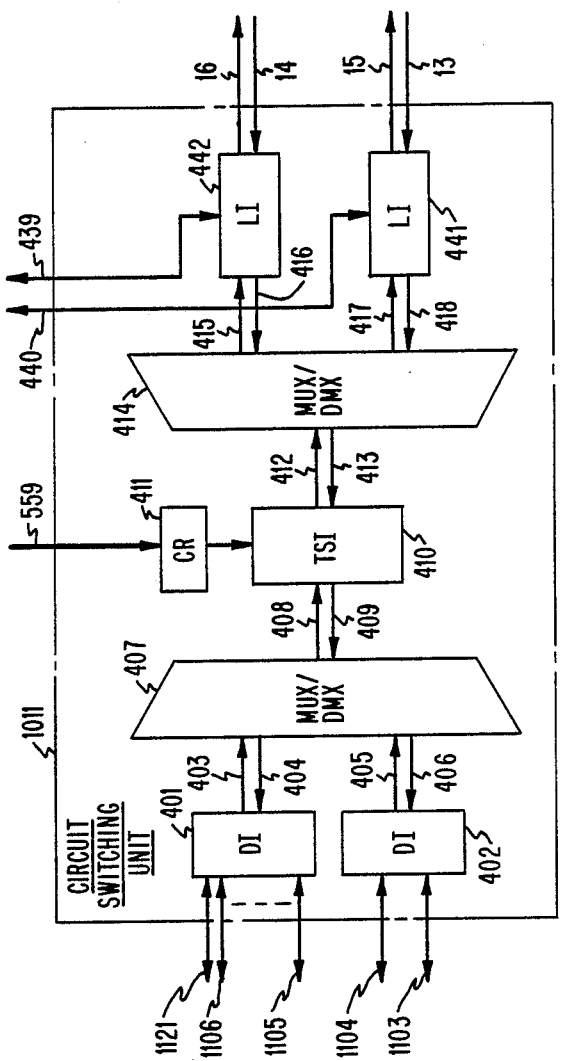
FIGS. 4 and 5 are diagrams of a circuit switching unit and an associated control unit included in the system of FIGS. 2 and 3.

Circuit-switching unit 1011 is shown in greater detail in FIG. 4. Incoming information is received on the 32-channel bidirectional data buses such as 1103 and 1104 from analog line unit 1101. A pair of data interfaces 401 and 402 multiplex the received information onto a pair of 256-channel time-multiplexed lines 403 and 405. A multiplexer/demultiplexer 407 further multiplexes the two 256-channel lines 403 and 405 onto a single 512-channel time-multiplexed line 408 for transmission to a time-slot interchanger 410. Time-slot interchanger 410 performs the circuit switching function of interchanging the order of time slots in accordance with instructions read from a control random access memory (RAM) 411. The reordered time slots are transmitted on a 512-channel time-multiplexed line 412 to a multiplexer/demultiplexer 414, which demultiplexes the 512 channels onto two 256-channel time-multiplexed lines 415 and 417. Lines 415 and 417 are received by a pair of link interfaces 441 and 442, which perform synchronizing and signal conditioning functions and then transmit the 256 channels received on each of the lines 415 and 417, to time-multiplexed switch 2010 via 256-channel incoming links 15 and 16.

In the reverse direction, time-multiplexed switch 2010 transmits information on two 256-channel outgoing links 13 and 14 to link interfaces 441 and 442. The 256 channels from each of the lines 13 and 14 are then transmitted by link interfaces 441 and 442 on two 256-channel time-multiplexed lines 418 and 416 to multiplexer/demultiplexer 414 which multiplexes the information onto a single 512-channel time-multiplexed line 413 to time-slot interchanger 410. Time-slot interchanger 410 reorders the received time slots in accordance with instructions read from control RAM 411, and transmits the reordered time slots on a 512-channel time-multiplexed line 409 to multiplexer/demultiplexer 407. Multiplexer/demultiplexer 407 demultiplexes the 512 channels onto two 256-channel time-multiplexed lines 404 and 406 to the data interfaces 401 and 402, which further demultiplex the information onto the 32-channel data buses such as 1103 and 1104.

Circuit/packet time-multiplexed switch (TMS) 2010 (FIG. 3) operates to provide inter-module connections for both circuit-switched and packet-switched calls as well as for conveying inter-module control packets between the control units of the switching modules, e.g., between control unit 1017 of switching module 1000 and a corresponding control unit in switching module 1050. The following description pertains to the operation of TMS 2010 in providing inter-module connections for circuit-switched calls. TMS 2010 includes a time-shared space division switch which operates in frames of 256 time slots or channels of approximately 488 nanoseconds each to complete paths from its input ports IP1 through IP255 to its output ports OP1 through OP255. Each switching module is connected to two input ports and two output ports. For example, switching module 1000 is connected via 256-channel incoming links 15 and 16 to input ports IP1 and IP2 and via 256-channel outgoing links 13 and 14 from output ports OP1 and OP2. TMS 2010 comprises two substantially identical switch units, odd switch unit 2100 and even switch unit 2200. Within odd switch unit 2100, conductors from every input port, e.g., conductor 1 from input port IP1 and conductor 253 from input port IP253, are combined into a multi-conductor E-bus 2102, and are coupled via bus portion 2103 to 128 input terminals of each of 128 selectors associated with the 128 output ports OP1 through OP255 of odd switching unit 2100. Only selector 2131-1 associated with output port OP1 and selector 2131-2 associated with output port OP253 are shown in FIG. 3. Selector 2131-1, for example, operates in response to instructions stored in a control RAM 2132-1 to connect different ones of its input terminals to a multiplexer 2133-1 during each of the 256 time slots of each frame. The output terminal of multiplexer 2133-1 is connected to output port OP1. As part of the process of establishing a conventional circuit-switched call from analog station 1001 to analog station 1051, for example, a time slot is selected that is available both to connect input port IP1 to output port OP253 and to connect input port IP253 to output port OP1. Assume that time slot TS43 is selected. As part of the establishment of the call, a TMS controller 2101 writes instructions via a control bus (not shown) into the control RAMs 2132-1 and 2132-2. The instructions written into control RAM 2132-1 define that during time slot TS43, conductor 253 is to be selected by selector 2131-1 for connection to output port OP1. The instructions written into control RAM 2132-2 define that during time slot TS43, conductor 1 is to be selected by selector 2131-2 for connection to output port OP253.

Figure 5:
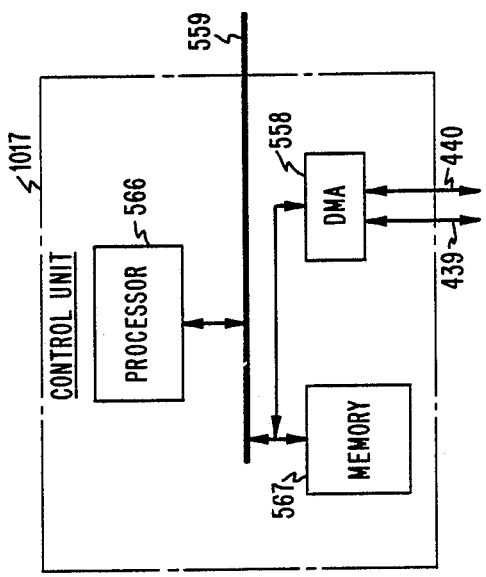

One time slot on each link between a switching module and TMS 2010 is reserved for control communications between the switching module control units and an administrative module 2030 which represents the central control of switching system 10. For example, time slot TS1 is the reserved control time slot on link 15 to input port IP1 and on link 13 from output port OP1. During time slot TS1, input port IP1 is always connected to output port OP255 and input port IP255 is always connected to output port OP1. Time slot TS2 is the reserved control time slot on link 16 to input port IP2 and on link 14 from output port OP2. During time slot TS2, input port IP2 is always connected to output port OP255 and input port IP255 is always connected to output port OP2. Similarly, the links to and from each of the other input/output port pairs have unique reserved control time slots. Control messages are generated by processor 566 (FIG. 5) within control unit 1017 and stored in a memory 567. A control message for administrative module 2030 is transmitted from memory 567 via a direct memory access (DMA) unit 558 and path 440 to link interface 441 where the message is inserted in six-bit segments into repetitions of time slot TS1 on incoming link 15 to input port IP1. During each occurrence of time slot TS1, input port IP1 is connected to output port OP255 and the six-bit segments of the control message are conveyed via output port OP255 to a message switch 2031 which accumulates the bits of the control message and then forwards the complete message on to administrative module 2030. Similarly control messages from administrative module 2030 to control unit 1017 are transmitted via message switch 2031, input port IP255, output port OP1 and outgoing link 13 to link interface 441 where the six-bit segments are extracted from time slot TS1 and conveyed via path 440 and DMA unit 558 to memory 567 within control unit 1017.

Figure 13:
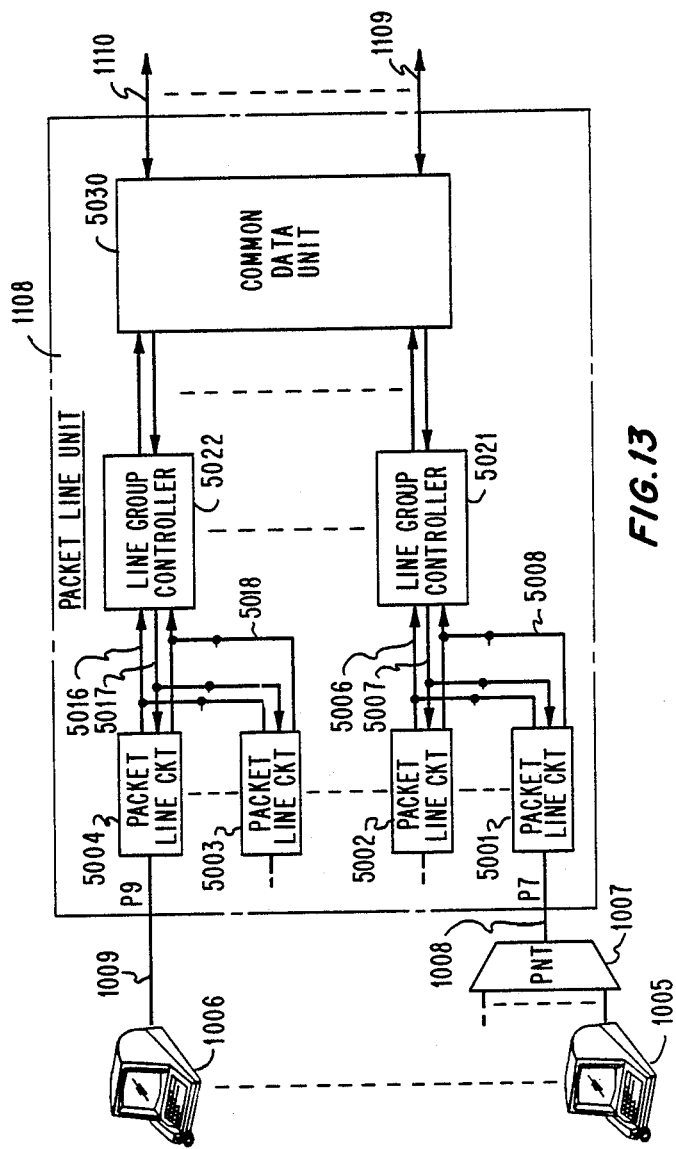
FIG. 13 is a diagram of a packet line unit included in the system of FIGS. 2 and 3.

Within switching module 1000, the PDSLs, e.g., 1008 and 1009, are terminated by a packet line unit 1108, shown in greater detail in FIG. 13. Packet line unit 1108 includes a number of groups of 32 packet line circuits. PDSL 1008 is terminated by packet line circuit 5001 which together with 31 other packet line circuits, e.g., 5002, comprise a packet line group controlled by a line group controller 5021. Similarly, line group controller 5022 controls a group of 32 packet line circuits, e.g., 5003 and 5004. The packet line circuits within a line group share a pair of time-multiplexed lines 5006 and 5007 used for transmitting information between the packet line circuits and their associated line group controller. For example, information is conveyed between line group controller 5021 and the associated group of line circuits including circuits 5001 and 5002, on the time-multiplexed lines 5006 and 5007. Similarly, information is conveyed between line group controller 5022 and the associated group of line circuits including circuits 5003 and 5004, on the time-multiplexed lines 5016 and 5017. Each of the time-multiplexed lines 5006, 5007, 5016 and 5017 comprise 32 time slots that recur in 125-microsecond frames. The first two time slots of each frame are reserved for control communication between the line circuits and the associated line group controller. The remaining 30 time slots of each frame are available for the transmission of packets between the packet line circuits and the line group controller.

As mentioned above, the electrical characteristics of the PDSLs, e.g., 1008 and 1009, are the same as that for the T-interface. Each packet line circuit, e.g., 5001, in addition to providing the necessary electrical interface to PDSL 1008, also includes two packet buffers (not shown). A first packet buffer accumulates incoming bits from PDSL 1008 into packets for transmission on time-multiplexed line 5006 to line group controller 5021. A second packet buffer accumulates bits received from line group controller 5021 on time-multiplexed line 5007 into packets for subsequent transmission on PDSL 1008.

The line circuits within a group share an additional time-multiplexed line to their line group controller for use in bidding to transmit a packet. The line circuits of the groups controlled by line group controllers 5021 and 5022 bid using time-multiplexed lines 5008 and 5018, respectively. Each of the time-multiplexed lines 5008 and 5018 also has 32 time slots, one time slot associated with each line circuit of the group. When packet line circuit 5001, for example, has received a complete packet from PDSL 1008, it transmits a bid during its associated time slot, e.g., time slot TS1, on time-multiplexed line 5008. Packet line circuit 5001 monitors the bids of the other line circuits in the group as asserted during the other time slots on time-multiplexed line 5008. If packet line circuit 5001 determines that it has transmitted the highest bid of the group, it proceeds to transmit a line identifier in a first time slot followed by the stored packet. The stored packet is transmitted using 14 of 16 bits during each of the 30 available time slots on time-multiplexed line 5006. The other two bits of each time slot are a parity bit computed over the time slot and a bit used to differentiate between the initial line identifier time slot and the subsequent packet conveying time slots. The packet transmission continues over several frames as necessary to complete the transmission of the packet. If packet line circuit 5001 has received another complete packet before the transmission of the first packet has been completed, it will retain access to time-multiplexed line 5006 and continue with the transmission of the second packet.

If packet line circuit 5001 determines that its initial bid is lower than one or more of the other packet line circuits in the group, it increases its bid and asserts the increased bid during its associated time slot on time-multiplexed line 5008 during the next frame. Packet line circuit 5001 continues to increase its bid until it has the highest bid and obtains access to transmit its packet. Note that line group controller 5021 does not grant access. Each packet line circuit determines independently whether it has the highest bid and controls the transmission of packets in response to such determination. Although line group controller 5021 does not perform arbitration, it does audit the statistical multiplexing of information from its associated group of line circuits, e.g., 5001, 5002, to detect faults such as more than one line circuit gaining access at the same time or one line circuit holding access for an excessively long time period. Packets could optionally include a service class identifier field defining a packet priority. A line circuit receiving a high priority packet would start bidding with an advanced bid.

In the reverse direction, line group controller 5021 transmits received packets using 30 of the 32 time slots on time-multiplexed line 5007. Only packet line circuits defined by the packet headers actually store received packets in their packet buffers for transmission on the PDSLs. Packetized information is conveyed between the line group controllers, e.g., 5021 and 5022, and packet switching unit 1400 via a common data unit 5030, and a number of bidirectional, time-multiplexed data buses, e.g., 1109 and 1110.

In the present exemplary embodiment, packet switching unit 1400 (FIG. 2) includes 96 protocol handlers 1700-0 through 1700-95, and packet interconnect 1800 which interconnects protocol handlers 1700-0 through 1700-95 and a processor interface 1300. Access from packet line unit 1108 to the protocol handlers 1700-0 through 1700-95 is obtained via six data fanout units 1600-0 through 1600-5, each associated with a group of 16 protocol handlers. Each user packet station, e.g., 1005, is associated with one of the protocol handlers 1700-0 through 1700-95, and, more particularly, with one of 32 High-level Data Link Control (HDLC) circuits (not shown) included in that associated protocol handler. In the present embodiment, communication links are established between the HDLC circuits of the protocol handlers and peer HDLC circuits (not shown) in the user packet stations at system initialization. These links are used to convey packets within HDLC frames in accordance with the well-known HDLC protocol.

The packets conveyed between user packet stations and associated protocol handlers are, in general, of variable length. Each user packet station, e.g., 1005, transmits and receives packets via one or more logical links. In accordance with the present example, logical link LL0 is used to convey signaling packets to set up packet-switched calls to and from user packet station 1005 and logical link LL1 is used to convey data packets during packet-switched calls to and from user packet station 1005. The logical link LL1 can be further subdivided into a plurality of logical channels for use when user packet station 1005 is engaged in a number of simultaneous packet-switched data calls. The logical link and logical channel numbers of each packet are defined by part of a header of that packet. Logical links LL2 and LL3 are used to convey voice packets and image packets, respectively. Data, voice and image packets are referred to generically herein as user information packets. Each packet received by a protocol handler from a user packet station is stored in a random access memory (not shown) in that protocol handler. If the received packet is a signaling packet, i.e., it was received in logical link LL0, it is transmitted via packet interconnect 1800 to processor interface 1300 for subsequent transmission to control unit 1017. If the received packet is a user information packet, i.e., it was received in one of the logical channels of one of the logical links LL1, LL2 and LL3 and a packet-switched call has previously been established to one of the user packet stations associated with switching module 1000, the user information packet is transmitted via packet interconnect 1800 to the protocol handler associated with the destination user packet station for subsequent transmission thereto. (If the packet-switched call is established between two user packet stations that are associated with the same protocol handler, the user information packets need not be transmitted via packet interconnect 1800. Instead the protocol handler simply transmits the user information packets in the appropriate channel to the destination user packet station.) In the present embodiment, six of the 96 protocol handlers are designated as inter-module protocol handlers. Protocol handlers 1700-15 and 1700-80 may, for example, be two of the six inter-module protocol handlers in packet switching unit 1400. Inter-module packet traffic is conveyed between the inter-module protocol handlers and circuit/packet time-multiplexed switch 2010, via the data fanout units 1600-0 through 1600-5, a number of bidirectional time-multiplexed data buses, e.g., 1105 and 1106, and circuit switching unit 1011. Each of the bidirectional data buses, e.g., 1105, comprises 32 time slots. Inter-module protocol handler 1700-15, for example, transmits inter-module packets via data fanout unit 1600-0 data bus 1105, and predetermined connections through circuit switching unit 1011 to an incoming packet channel comprising 32 predetermined packet time slots on the 256 time. slot incoming time-multiplexed link 15. Similarly, packets are transmitted from an outgoing packet channel comprising 32 predetermined packet time slots on the 256 time slot outgoing time-multiplexed link 13, via predetermined connections through circuit switching unit 1011, data bus 1105 and data fanout unit 1600-0 to inter-module protocol handler 1700-15. Since 12 bits of each packet time slot are used to convey packets, the incoming and outgoing packet channels are 3.072 megabits per second channels. One incoming and outgoing packet channel is used for inter-module packet traffic between each of the six inter-module protocol handlers and circuit/packet time-multiplexed switch 2010. In the present embodiment, each of the incoming links 15 and 16 include three 3.072 megabits per second incoming packet channels and each of the outgoing links 13 and 14 include three 3.072 megabits per second outgoing packet channels. If a user information packet is received in a logical channel which has previously been established for use in a packet-switched call to a user packet station served by one of the other switching modules, e.g., user packet station 1056 served by switching module 1050, the user information packet is transmitted via packet interconnect 1800 to inter-module protocol handler 1700-15 for subsequent transmission via circuit switching unit 1011 and time-multiplexed switch 2010, and then via an inter-module protocol handler and packet interconnect in switching module 1050 to the protocol handler that is associated with the destination user packet station 1056.

When a given protocol handler, e.g., 1700-0, has received a complete packet from a user packet station and has determined the destination of that packet, i.e., either one of the other protocol handlers or processor interface 1300, it transmits a logic zero Request To Send (RTS) signal on one conductor of a six-conductor bus 1701-0 to packet interconnect 1800. Similarly, when processor interface 1300 has a packet ready for transmission to one of the protocol handlers, it transmits a logic zero RTS signal on one conductor of six-conductor bus 1301. Packet interconnect 1800 enables each of the protocol handlers and processor interface 1300 to transmit in a predetermined sequence. Since processor interface 1300 transmits signaling packets to all of the user packet stations served by switching module 1000 and, in addition, transmits all inter-module control packets from control unit 1017, the sequence effected by packet interconnect 1800 enables processor interface 1300 sixteen times for each enabling of an individual protocol handler. When the packet interconnect 1800 sequence reaches protocol handler 1700-0, packet interconnect 1800 responds to the RTS signal on bus 1701-0 by transmitting a logic zero Clear To Send (CTS) signal on a second conductor of bus 1701-0 to protocol handler 1700-0. Protocol handler 1700-0 responds to the CTS signal by transmitting its stored packet at a high rate, e.g., 10 megabits per second, via packet interconnect 1800 to its destination. All of the protocol handlers and processor interface 1300 can receive the packet, but in the present embodiment, typically only one destination as defined by the packet header actually stores the packet for subsequent transmission. Only after the complete packet has been transmitted by protocol handler 1700-0, does the packet interconnect 1800. sequence resume. The receipt of the packet by the destination protocol handler or by processor interface 1300 is acknowledged by the transmission of an acknowledgment packet back to protocol handler 1700-0.

U.S. Pat. No. 4,596,010, issued to M. W. Beckner et al. on June 17, 1986, is incorporated by reference herein. The incorporated U.S. Pat. No. 4,596,010 describes packet switching unit 1400 and processor interface 1300 in greater detail.

A code converter 1107, interposed via 32-channel bidirectional data buses 1121 and 1122 between circuit switching unit 1011 and packet switching unit 1400, is used to allow communication between an analog station, e.g., 1001, and a user packet station, e.g., 1005. The code converter 1107 receives voice packets from user packet stations via packet switching unit 1400, performs a conversion to digital PCM voice samples, and transmits the samples in the time slots of consecutive frames via circuit switching unit 1011 to analog station 1001. In the reverse direction, code converter receives digital PCM voice samples from circuit switching unit 1011 representing analog speech signals from analog station 1001, and formulates voice packets for transmission via packet switching unit 1400 to user packet station 1005.

A digital facility interface 1111 is used to interface the high speed link 1010 from another packet switching system to switching system 10. The 1.544 megabits per second packet channel received on high speed link 1010 is conveyed on a 32-time slot bidirectional data bus 1112 to data fanout unit 1600-0 in packet switching unit 1400.

One incoming and outgoing packet channel on the links 15 and 13, respectively, are reserved for conveying inter-module control packets. Within control unit 1017, processor 566 (FIG. 5) generates inter-module control packets and stores such packets in memory 567. The packets are subsequently transferred via path 559 to processor interface 1300. Processor interface 1300 subsequently transmits the packets via packet interconnect 1800, one of the inter-module protocol handlers, e.g., protocol handler 1700-80, data bus 1106 and circuit switching unit 1011, to one of the 3.072 megabits per second incoming packet channels on incoming link 15. In the reverse direction, inter-module control packets received on one of the 3.072 megabits per second outgoing packet channels on outgoing link 13, are conveyed via circuit switching unit 1011, data bus 1106, inter-module protocol handler 1700-80, packet interconnect 1800, and processor interface 1300 to control unit 1017. The functions of inserting and extracting the packet time slots forming the packet channels are carried out in link interfaces 441 and 442 of circuit switching unit 1011 (FIG. 4) in accordance with packet time slot definitions stored in control RAMs (not shown).

Within TMS 2010, the information in the three incoming packet channels each comprising 32 packet time slots received on incoming link 15 at input port IP1 is stored in an incoming packet buffer arrangement 2120-1. The definition of the time slots on incoming link 15 that are packet time slots are stored in control RAM 2132-1 at system initialization by TMS controller 2101. Such definitions are then conveyed from control RAM 2132-1 to incoming packet buffer arrangement 2120-1 such that the proper time slots from link 15 are extracted. Each input port has a similar associated incoming packet buffer arrangement. For example, input port IP253 has associated incoming packet buffer arrangement 2120-2. The output conductors from every incoming packet buffer arrangement, e.g., conductor 1P from incoming packet buffer arrangement 2120-1 and conductor 253P from incoming packet buffer arrangement 2120-2, are combined into multiconductor E-bus 2102, and are coupled via bus portion 2104 to 128 input terminals of each of 128 selectors associated with the 128 output ports OP1 through OP255 of odd switch unit 2100. Only selector 2128-1 associated with output port OP1 and selector 2128-2 associated with output port OP253 are shown in FIG. 3. The transmission of packets from incoming packet buffer arrangements, e.g., 2120-1 and 2120-2, and the selection of input conductors by the selectors, e.g., 2128-1 and 2128-2, are controlled by a control ring 2110 including a plurality of transmit control nodes, e.g., 2123-1 and 2123-2, a plurality of selector control nodes, e.g., 2124-1 and 2124-2, and a ring repeater 2140. Control ring 2110 includes an eight-conductor bus 2111 comprising a seven-bit status bus and a single throttle bit. The status bus is used to define the status of the selectors, e.g., 2128-1 and 2128-2, as to whether they are presently being used to convey a packet or not. The status bus defines the status of each of the 128 selectors by a sequence of 128 status words repetitively transmitted around ring 2110. A status word comprising seven logic zeroes (0000000) defines that the selector is presently idle, i.e., it is not conveying a packet. A nonzero status word defines that the selector is presently conveying a packet and the particular sevenbit status word defines which of the 128 incoming packet buffer arrangements is presently transmitting a packet to that selector. The ring cycle of 128 status words repeats 32 times during each 125-microsecond frame. Assume that a packet has been received by incoming packet buffer arrangement 2120-1 and that the packet address defines that the packet is destined for switching module 1050. Incoming packet buffer arrangement 2120-1 transmits a signal, referred to herein as a packet present signal, on a conductor 2119-1 to transmit control node 2123-1. Incoming packet buffer arrangement 2120-1 also transmits a request pulse on a conductor 2121-1 to transmit control node 2123-1 coincident with the arrival of the status word defining the status of selector 2128-2. If that status word is 0000000 defining that selector 2128-2 is presently idle, transmit control node 2123-1 substitutes a nonzero status word 0000001 defining input port IP1, or equivalently switching module 1000. When selector control node 2124-2 subsequently receives the nonzero status word 0000001 at the time associated with selector 2128-2, node 2124-2 transmits the status word 0000001 via a path 2126-2 for storage in a latch 2129-2. The storage in latch 2129-2 is effected by the transmission of a strobe pulse from selector control node 2124-2 via a conductor 2125-2 to latch 2129-2. The contents of latch 2129-2 define which of the 128 input terminals is selected by selector 2128-2 for connection to an outgoing packet buffer arrangement 2130-2. The status word 0000001 in latch 2129-2 defines that selector 2128-2 is to connect conductor 1P to outgoing packet buffer arrangement 2130-2. Transmit control node 2123-1 subsequently transmits a go signal via a conductor 2122-1 to incoming packet buffer arrangement 2120-1. The go signal is transmitted by transmit control node 2123-1 at least one ring cycle after the request signal was received from incoming packet buffer arrangement 2120-1 in order to assure that selector 2128-2 has been appropriately set. In response to the go signal, incoming packet buffer arrangement 2120-1 transmits the received packet via conductor 1P of E-bus 2102 and selector 2128-2 to outgoing packet buffer arrangement 2130-2. Control RAM 2132-2 controls the operation of a multiplexer 2133-2 to combine circuit-switched information from selector 2131-2 and packet-switched information from outgoing packet buffer arrangement 2130-2 onto the single 256-channel time-multiplexed link 21 from output port OP253. During each of the 96 predetermined packet time slots of the three packet channels, outgoing packet buffer arrangement 2130-2 transmits a 12-bit segment of a stored packet via multiplexer 2133-2 to output port OP253 for transmission to switching module 1050. During the remaining time slots, the circuit-switched information from selector 2131-2 is transmitted via multiplexer 2133-2 to output port OP253 for transmission to switching module 1050.

Once the complete packet is transmitted by incoming packet buffer arrangement 2120-1, it removes the packet present signal from conductor 2119-1. In response to such removal, transmit control node 2123-1 substitutes the idle status word 0000000 for the status word 0000001 defining the status of selector 2128-2.

Even if the selector 2128-2 is idle at a particular time such that the status word 0000000 is present at the appropriate point of each ring cycle, the outgoing packet buffer arrangement 2130-2 may not be ready to receive a packet. If not, outgoing packet buffer arrangement 2130-2 transmits a logic zero throttle bit via a conductor 2127-2 to selector control node 2124-2. The logic zero throttle bit is inserted on control ring 2110 by selector control node 2142-2, at the same point in the ring cycle that the status word associated with selector 2128-2 is transmitted. The logic zero throttle bit prevents any of the transmit control nodes from effecting the transmission of a packet to selector 2128-2.

Each incoming packet buffer arrangement includes one incoming packet buffer for each incoming packet channel on the associated incoming link. For example, incoming packet buffer arrangement 2120-1 (FIG. 10) includes three incoming packet buffers 3001, 3002 and 3003, one for each of the 3.072 megabits per second incoming packet channels recerved at input port IP1 on incoming link 15.

Figure 9:
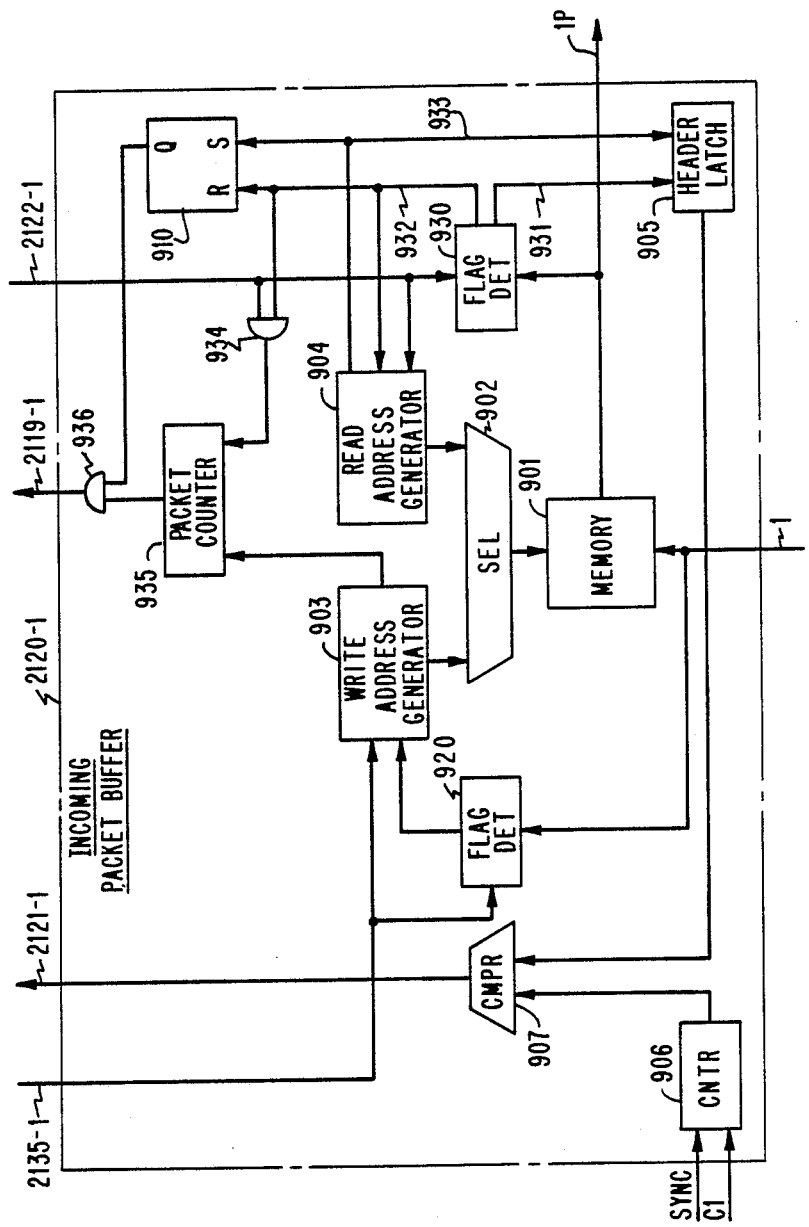
FIG. 9 is a diagram of an incoming packet buffer used in an incoming packet buffer arrangement as shown in FIG. 10.
Figure 10:
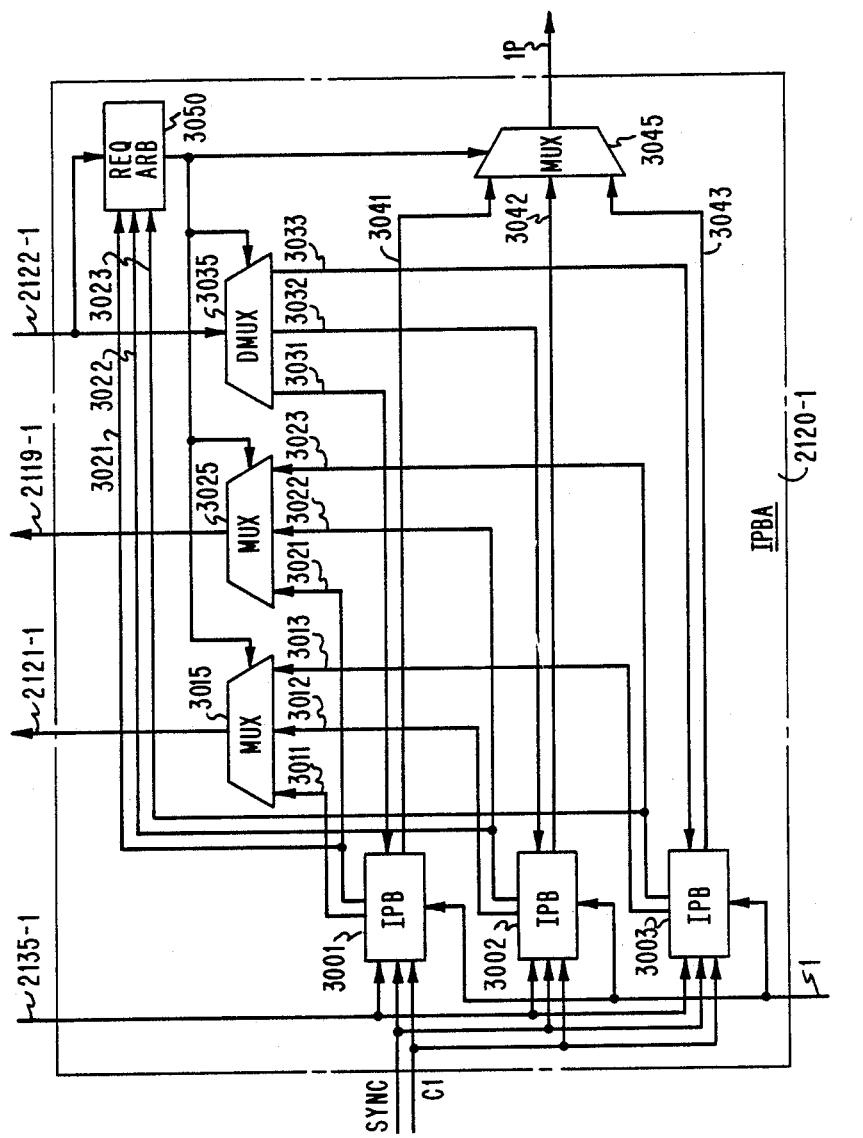
FIG. 10 is a diagram of the incoming packet buffer arrangement included in the system of FIGS. 2 and 3.

Incoming packet buffer 2120-1 (FIG. 9) includes a memory 901 for storing bits received in the packet time slots on incoming link 15 to input port IP1. Such packets are conveyed to memory 901 via conductor 1. The writing and reading of memory 901 are controlled by a write address generator 903 and a read address generator 904, which selectively access memory 901 via a selector 902. Signals on conductor 2135-1 from control RAM 2132-1 define the input port IP1 packet time slots to write address generator 903 and to a flag detector 920, which detects the opening and closing flags of each received packet. When flag detector 920 informs write address generator 903 that an opening flag has been received, write address generator 903 effects the writing of the bits of the packet into memory 901. When flag detector 920 informs write address generator 901 that the closing flag has been received, write address generator controls the termination of writing into memory 901 and also increments by one a packet counter 935, used to count the number of packets stored in memory 901. After the complete packet has been stored, read address generator 904 effects the transmission of the initial bits of the packet to a flag detector 930, which upon detecting the packet opening flag, controls the subsequent transmission of the module subfield of the packet header (with any inserted zero bits deleted) to a header latch 905. Read address generator 904 transmits a logic one signal on conductor 933 to cause the storage of the module subfield in latch 905 and to set a S-R flip-flop 910. An AND gate 936, which receives at its two input terminals the output signal from flip-flop 910 and a signal from packet counter 935 indicating that at least one packet is available in memory 901, then transmits the packet present signal on conductor 3021 to a multiplexer 3025 included in incoming packet buffer arrangement 2120-1 (FIG. 10). A counter 906 receives a 32.768-megahertz clock signal C1 and an 8.0-kilohertz synchronizing signal SYNC from a system clock 2150. Counter 906 is a seven-bit counter which is incremented from 0000000 to 1111111 once during each cycle of control ring 2110. Counter 906 counts an internally delayed version of the synchronizing signal SYNC. The amount of internal delay depends on the position of incoming packet buffer arrangement 2120-1 with respect to control ring 2110. A comparator 907 compares the count present in counter 906 with the module subfield stored in header latch 905. When the count present in counter 906 is equal to the module subfield stored in header latch 905, comparator 907 transmits a logic one request pulse on a conductor to a multiplexer 3015 included in incoming packet buffer arrangement 2120-1. When the module subfield defines switching module 1050, for example, as the packet destination, the request pulse transmitted by comparator 907 coincides with the presence on control ring 2110 at transmit control node 2123-1 of the status word defining the status of selector 2128-2.

When transmit control node 2123-1 returns a go signal on conductor 2122-1, the go signal is conveyed via a demultiplexer 3035 (FIG. 10) and a conductor 3031 to read address generator 904, which initiates the transmission of the packet (including the packet header) on conductor 1P. When flag detector 930 detects the packet closing flag, detector 930 transmits a stop signal on conductor 932 to reset flip-flop 910 such that the packet present signal on conductor 3021 is removed. An AND gate 934, which receives the stop signal on conductor 932 and the go signal on conductor 3031 at its two input terminals, transmits a logic one signal to packet counter 935 to decrement counter 935 by one to properly account for the transmitted packet. An additional counter (not shown) is used to assure that write address generator 903 does not overtake read address generator 904.

Incoming packet buffers 3002 and 3003 (FIG. 10) are coupled to multiplexer 3015, multiplexer 3025, demultiplexer 3035 and multiplexer 3045 via conductors 3012, 3022, 3032, 3042 and conductors 3013, 3023, 3033 and 3043 respectively. A request arbitration circuit 3050 also receives the packet present signals transmitted on conductors 3021 through 3023 and the go signal transmitted on conductor 2122-1 and determines which one of the incoming packet buffers 3001 through 3003 is allowed to next transmit a stored packet. Request arbitration circuit 3050 controls multiplexer 3015, multiplexer 3025, demultiplexer 3035, and multiplexer 3045 such that the appropriate signals are conveyed between the selected packet buffer and transmit control node 2123-1 and the bits of the packet stored in the selected packet buffer are transmitted to conductor 1P of multiconductor bus 2102. Request arbitration circuit 3050 does not change multiplexer and demultiplexer selections until the go signal on conductor 2122-1 is removed.

Figure 6:
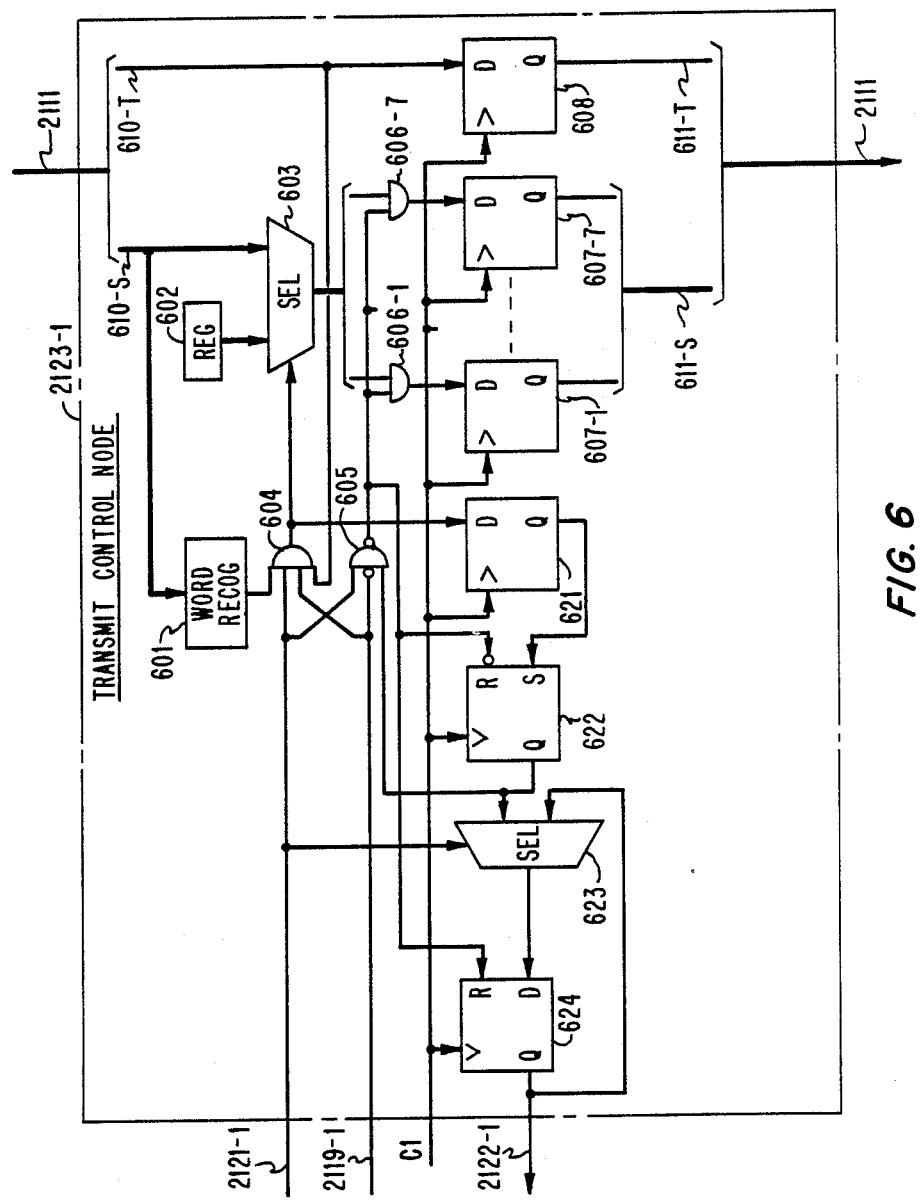
FIGS. 6 through 8 are diagrams of a transmit control node, a selector control node, and a ring repeater which are connected in a control ring as shown in FIG. 3.

Transmit control node 2123-1 (FIG. 6) includes a word recognition circuit 601 that receives the seven-conductor status bus 610-S of control ring 2110 and transmits a logic one signal to one input terminal of a four-input AND gate 604 whenever status bus 610-S defines the idle status word 0000000. The other three input terminals of AND gate 604 receive the request pulse and packet present signal on conductors 2121-1 and 2119-1 from incoming packet buffer arrangement 2120-1, and a throttle bit conductor 610-T of control ring 2110. Assume again that the request pulse defines selector 2128-2 associated with switching module 1050. AND gate 604 generates a logic one pulse coincident with the request pulse received on conductor 2121-1 only when: (1) the packet present signal is present on conductor 2119-1, (2) word recognition circuit 601 is generating a logic one indicating the presence of the idle status word 0000000 on status bus 610-S, and (3) the throttle bit associated with the idle status word 0000000 is a logic one indicating that outgoing packet buffer arrangement 2130-2 is presently able to receive a packet. Status bus 610-S is also received by a selector 603 which, in the absence of a logic one signal from AND gate 604, transmits the status word on status bus 610-S via AND gates 606-1 through 606-7 for storage in flip-flops 607-1 through 607-7. However, when AND gate 604 transmits a logic one signal, selector 603 instead transmits the status word stored in register 602 to AND gates 606-1 through 606-7 for storage in flip-flops 607-1 through 607-7. For transmit control node 2123-1, register 602 stores the status word 0000001 defining the associated input port IP1 and switching module 1000. Each status word and associated throttle bit stored by flip-flops 607-1 through 607-7 and 608 are subsequently transmitted via status bus 611-S and throttle conductor 611-T to control ring 2110 in response to the clock signal C1. The logic one pulse generated by AND gate 604 is also transmitted to a flip-flop 621, which in turn sets a S-R type flip-flop 622. A selector 623, which is controlled by the request pulse on conductor 2121-1, receives the Q output signal from flip-flop 622 and the Q output signal from a flip-flop 624. When the request pulse occurs again on conductor 2121-1 after the completion of a full ring cycle, the logic one signal generated at the Q output of flip-flop 622 is transmitted by selector 623 to be stored by flip-flop 624. Since the Q output of flip-flop 624 is returned to selector 623, it remains at a logic one level until flip-flop 624 is subsequently reset as described herein. The logic one level is transmitted as the go signal via conductor 2122-1 to incoming packet buffer arrangement 2120-1. The D and S-R flip-flops of transmit control node 2123-1 operate synchronously.

When incoming packet buffer arrangement 2120-1 completes the transmission of the packet, it removes the packet present signal on conductor 2119-1. Such removal is detected by a three-input NAND gate 605, which receives conductor 2119-1 at an inverting input terminal, and which receives the request pulses generated on conductor 2121-1 and the logic one signal generated by flip-flop 622 at its two non-inverting input terminals. When the packet present signal is removed on conductor 2119-1, NAND gate 605 transmits a logic zero pulse coincident with the next request pulse received on conductor 2121-1. The logic zero pulse transmitted by NAND gate 605 acts to reset flip-flops 622 and 624 such that they are ready to control the transmission of another packet. The logic zero pulse is also coupled to input terminals of the AND gate 606-1 through 606-7 such that the idle status word 0000000 is substituted for the status word 0000001 on status bus 611-S again defining selector 2128-2 as idle.

Figure 7:
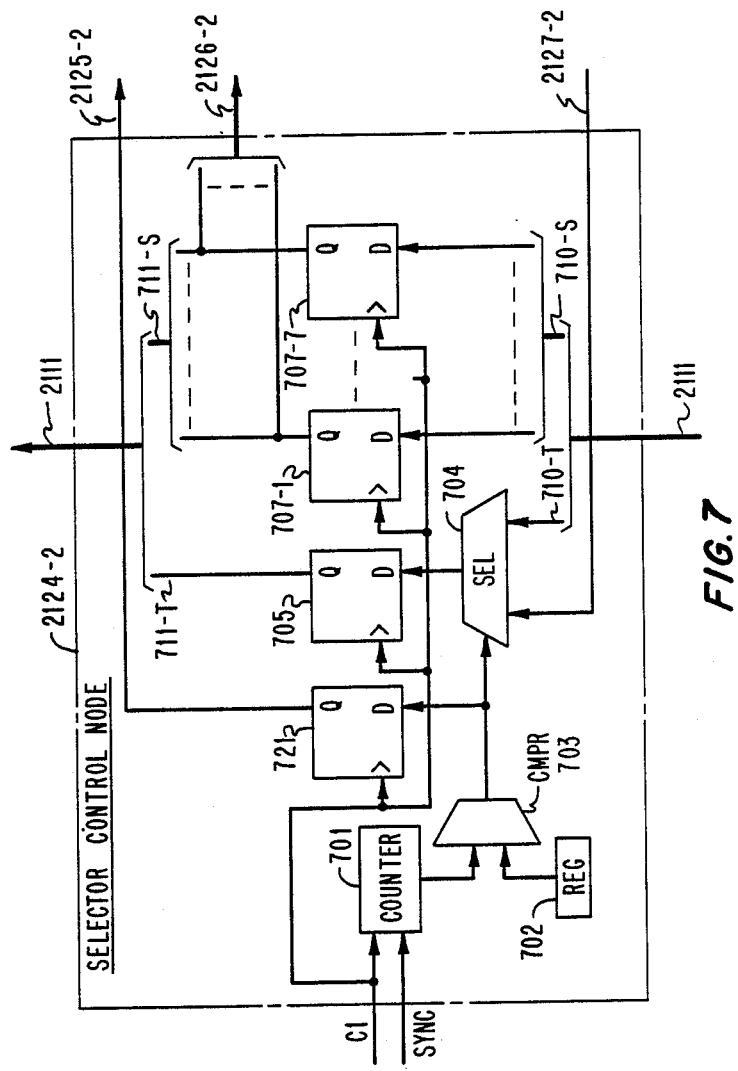

Selector control node 2124-2 (FIG. 7) receives via eight-conductor bus 2111 each status word and associated throttle bit from control ring 2110 on a status bus 710-S and a throttle bit conductor 710-T. The status words are stored in flip-flops 707-1 through 707-7 and subsequently transmitted in response to the clock signal C1. A seven-bit counter 701 receives the clock signal C1 and the synchronizing signal SYNC from system clock 2150 and is sequentially incremented from 0000000 to 1111111 once during each ring cycle. A comparator 703 compares the count generated by counter 701 with a seven-bit word stored in a register 702 defining the output port or switching module associated with that selector control node. In selector control node 2124-2, the word stored in register 702 is 1111110 defining the output port OP253 and the associated switching module 1050. Accordingly, comparator 703 generates a logic one strobe pulse which coincides with the presence on control ring 2110 at selector control node 2124-2 of the status word defining the status of selector 2128-2. The logic one strobe pulse is delayed by one cycle of clock signal C1 by a flip-flop 721 and is then transmitted on conductor 2125-2 to latch 2129-2 to effect the storage in latch 2129-2 of the status word on the output status bus 711-S from flip-flops 707-1 through 707-7. The throttle bit from outgoing packet buffer arrangement 2130-2 is transmitted via conductor 2127-2 to a selector 704 which also receives the throttle bit conductor 710-T from control ring 2110. The throttle bits from conductor 710-T are all transmitted by selector 704 to a flip-flop 705 with the exception of the throttle bit coinciding with the strobe pulse from comparator 703. When the strobe pulse is present, the throttle bit on conductor 2127-2 from outgoing packet buffer arrangement 2130-2 is instead transmitted to flip-flop 705 for subsequent transmission via conductor 711-T to control ring 2110. In this manner, a logic zero throttle bit from outgoing packet buffer arrangement 2130-2, which indicates that outgoing packet buffer arrangement 2130-2 is unable to receive a packet, is inserted on control ring 2110 in association with the status word defining the status of selector 2128-2.

Figure 11:
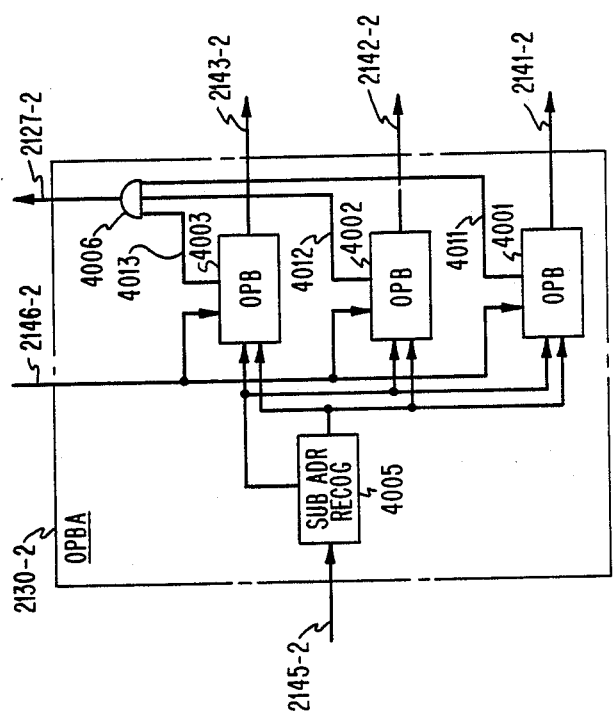
FIG. 11 is a diagram of an outgoing packet buffer arrangement included in the system of FIGS. 2 and 3.

The packet header of each packet transmitted on an incoming packet channel on one of the incoming links, e.g., 15, to TMS 2010 includes in addition to the seven-bit address defining the destination outgoing link, a subaddress defining which of the multiple packet channels on the destination outgoing link is to receive the packet. Outgoing packet buffer arrangement 2130-2 (FIG. 11) includes a subaddress recognition circuit 4005, which determines the appropriate one of three outgoing packet buffers 4001 through 4003 to receive each packet on conductor 2145-2 from selector 2128-2 based on the packet subaddress. The outgoing packet buffers 4001 through 4003 are each associated with one of three 3.072 megahertz outgoing packet channels on outgoing link 21 to switching module 1050. The packets transmitted by outgoing packet buffers 4001 through 4003 are conveyed via conductors 2141-2 through 2143-2 to multiplexer 2133-2 where such packets are combined with the circuit-switched information from selector 2131-2 for transmission on outgoing link 21. The definitions of the 32 predetermined packet time slots of each of the three packet channels are conveyed from control RAM 2132-2 to the three outgoing packet buffers 4001 through 4003 via a path 2146-2 and to multiplexer 2133-2 to control the transmission and insertion of 12-bit packet segments into the proper time slots on link 21. When one of the outgoing packet buffers 4001 through 4003 is unavailable to receive a packet, it transmits a logic zero signal on the associated one of three conductors 4011 through 4013 to an AND gate 4006. In response, AND gate 4006 transmits a logic zero throttle bit on conductor 2127-2 to selector control node 2124-2.

Figure 8:
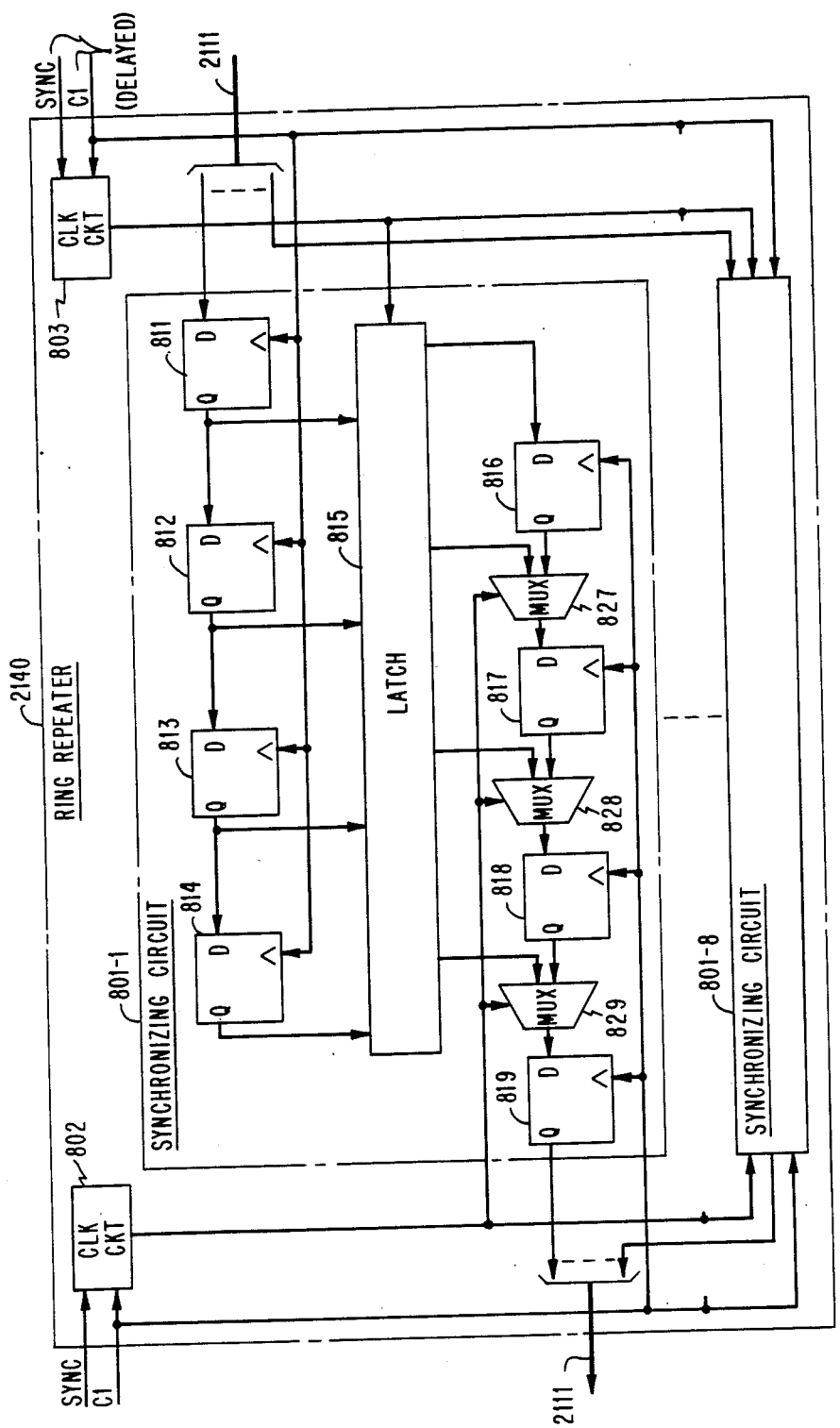

System clock 2150 (FIG. 2) derives its timing from an external source, e.g., another switching system, and distributes its 32.768 megahertz system clock signal C1 and its 8.0 kilohertz synchronizing signal SYNC via E-bus 2102 to the various components within TMS 2010. The clock signals are delayed as they traverse E-bus 2102. A ring repeater 2140 which joins the beginning of control ring 2110 with the end of control ring 2110 operates to resynchronize the status words and throttle bits received on the conductors of control ring 2100 as they begin their next cycle. Ring repeater (FIG. 8) includes eight synchronizing circuits 801-1 through 801-8, one for each conductor of bus 2111, and two clock circuits 802 and 803. Synchronizing circuit 801-1 includes four flip-flops 811 through 814 which sequentially receive and store four bits from a first conductor of bus 2111 in response to the delayed clock signal C1. The four bits stored in flip-flops 811 through 814 are simultaneously stored in a latch 815 in response to a clock signal derived by clock circuit 803 from the delayed clock and synchronizing signals, C1 and SYNC. The contents of latch 815 are subsequently transmitted in parallel to four flip-flops 816 through 819 in response to a clock signal derived by clock circuit 802 from the non-delayed clock and synchronizing signals C1 and SYNC. Multiplexers 827, 828 and 829 select either the parallel inputs from latch 815 for storage in flip-flops 817, 818 and 819 respectively, or the output signals from the preceding flip-flops 816, 817 and 818. The four bits stored in flip-flops 816 through 819 are sequentially transmitted on the first conductor of bus 2111 in response to the non-delayed clock signal C1. Seven additional synchronizing circuits, e.g., synchronizing circuit 801-8, perform the same function for the other seven conductors of bus 2111. Thus any timing skew which may result from the traversal of the signals around control ring 2110 is removed before the next ring cycle is initiated.

The call processing required to establish both circuit-switched calls and packet-switched calls within system 10 is performed cooperatively by the control units of the switching modules, e.g., control unit 1017 in switching module 1000, and by administrative module 2030. In the present embodiment, administrative module 2030 stores global data such as the available circuit-switched paths through time-multiplexed switch 2010. Recall that establishing a circuit-switched path between modules 1000 and 1050 involves selecting an available circuit-switched time slot on the links between modules 1000 and 1050 and time-multiplexed switch 2010. Administrative module 2030 stores the global data defining the availability of circuit-switched time slots to time-multiplexed switch 2010 and performs the selection of the time slot to be used for a given inter-module circuit-switched call. (A method where the time slot selection and all other call processing functions are cooperatively performed by the switching module control units without involving administrative module 2030 is disclosed in U.S. patent application No. 699,465 of S. Chang, filed on Feb. 7, 1985, and assigned to the assignee of the present application.) Administrative module 2030 also stores the data defining the association of protocol handlers, e.g., 1700-0, to user packet stations. Such data is used during the establishment of a packet-switched call to generate the required routing table entries in the protocol handlers associated with both the originating and terminating user packet stations. Although administrative module 2030 is used to store such global data in the present embodiment, a switching module could also be used to store that data. In the latter case, all interprocessor communication needed for processing calls could be effected using the packet switching capability of time-multiplexed switch 10 without involving message switch 2031 and administrative module 2030.

FIG. 14 is a signaling diagram illustrating the exchange of call control messages using logical link LL0 for setting up a virtual circuit for a packet-switched call from user packet station 1005 to user packet station 1056. Assume that a user at user packet station 1005 goes off-hook by lifting a handset. Station 1005 initially transmits a SETUP message to switching system 10. The SETUP message includes a call reference value (CRV) selected by station 1005. The selected CRV is included in all subsequent signaling messages between station 1005 and switching system 10 concerning the particular call. Switching system 10 returns a SETUP ACK message to station 1005. The user at station 1005 then enters via a keypad the directory number assigned to station 1056 and station 1005 transmits a sequence of INFO messages each including one or more digits of the directory number. Switching system 10 uses the received directory number as a key to translation data to determine the identity of station 1056. Switching system 10 selects a CRV for use in identifying the call in the signaling messages to be conveyed between switching system 10 and station 1056. Switching system 10 then transmits a SETUP message informing station 1056 of the incoming call. Switching system 10 also returns a CALL PROC message to station 1005 indicating that a call is being set up in response to the received directory number. In response to the SETUP message, station 1056 enters an alerting state and begins ringing. Station 1056 then returns an ALERTING message to switching system 10, which message is also conveyed back to originating station 1005. Subsequently when the handset of station 1056 is lifted to answer the call, station 1056 transmits a CONNECT message to switching system 10, which in turn transmits the CONNECT message on to station 1005. The two parties can now communicate.

Within switching system 10, the packet-switched call is established by creating a virtual circuit. This is accomplished by storing routing information in the protocol handlers associated with the originating and terminating stations (and in the inter-module protocol handlers if the call is an inter-module call) such that packets received from the originating station by the associated protocol handler in the particular originating logical channel assigned to the call are always transmitted to the protocol handler associated with the terminating station, and packets received from the terminating station by the associated protocol handler in the terminating logical channel assigned to the call are always transmitted to the protocol handler associated with the originating station.

Once the virtual circuit has been established, voice packets are exchanged between stations 1005 and 1056 as the two parties engage in conversation. When the user at station 1005, for example, returns the handset, station 1005 transmits a DISCONNECT message to switching system 10. Switching system 10 then tears down the virtual circuit by removing the various routing entries made in the protocol handlers and then transmits RELEASE message to both stations 1005 and 1056. In response, stations 1005 and 1056 both return RELCOMP messages to switching system 10.

Virtual PBX Groups

Assume that the users at stations 1005, 1006, 1055 and 1056 are highly interactive and wish to have control over the processing of their communications independent of switching system 10. Stations 1005, 1006, 1055 and 1056 may form what is referred to herein as a virtual PBX group. Switching system 10 establishes permanent virtual circuits between each pair of stations in the group, either at system initialization or in a response to a customer order. For the group of four stations 1005, 1006, 1055 and 1056, six permanent virtual circuits, designated as virtual circuits 9001 through 9006 are established (FIG. 15). FIG. 16 shows portions of the packet format used by members of the virtual PBX group. The packet header includes an identification of the virtual circuit number and source address and, in addition, a packet type field defining the packet as a virtual PBX packet and whether the packet is for signaling, voice, data or image communication. For virtual PBX signaling packets, the initial bits of the information field define one of a number of call control packets that are used in controlling the establishment and termination of intra-group calls. The protocol handlers check the source address of all virtual PBX packets as a means of preventing the fraudulent communication of packets from stations that are not included in the group. The protocol handlers associated with the stations in the group each count all packets conveyed on the established permanent virtual circuits for use in billing.

Figure 17:
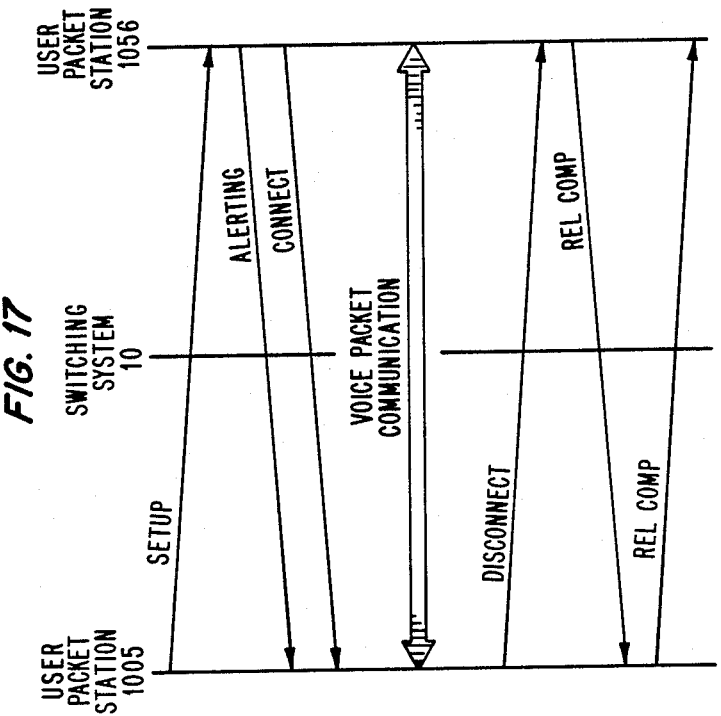

Once the group is established, i.e., switching system 10 has set up permanent virtual circuits 9001 through 9006, a voice call from station 1005 to station 1056 can be completed without involving the control entities of switching system 10. A signaling diagram for such a call is shown in FIG. 17. Assume that the user at station 1005 goes off-hook by lifting the handset and then enters a directory number or speed call designation defining station 1056. Station 1005 determines that station 1056 is part of its virtual PBX group and that virtual circuit 9003 has been established between station 1005 and 1056. Station 1005 then transmits a SETUP packet via circuit 9003 to station 1056. The SETUP packet may include a call reference value (CRV) for use by both stations 1005 and 1056 in identifying packets that are part of the call. If station 1056 is idle, it responds to the SETUP packet by ringing and by returning an ALERTING packet via circuit 9003 to station 1005. Station 1005 may generate audible ringing in response to the ALERTING packet. When a user at station 1056 lifts the handset to answer the call, station 1056 returns an CONNECT packet via circuit 9003 to station 1005. In response to the CONNECT packet, station 1005 terminates audible ringing. The two parties can now communicate and voice packets are exchanged between stations 1005 and 1056 using circuit 9003. The voice packets are distinguished from the previous signaling packets by a logic zero identifier bit at the beginning of the packet information field. When the user at station 1005 returns the handset, station 1005 transmits a DISCONNECT packet via circuit 9003 to station 1056. Stations 1056 and 1005 subsequently exchange REL COMP packets via circuit 9003.

Figure 18:
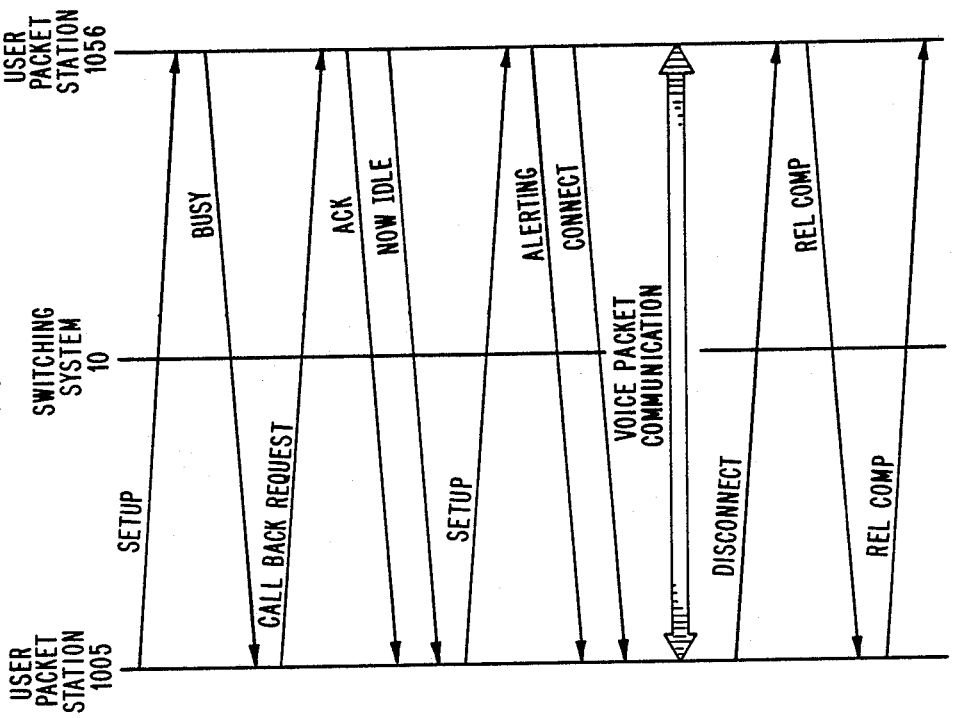
FIGS. 17 through 19 are signaling sequence diagrams for the setup of various call examples illustrating features such as automatic callback and call forwarding among the members of the virtual PBX group of FIG. 15.

A signaling diagram for a second illustrative call is shown in FIG. 18. Station 1005 transmits a SETUP packet via circuit 9003 to station 1056 as in FIG. 17. However, in this case station 1056 is busy. Accordingly, station 1056 returns a BUSY packet via circuit 9003 to station 1005 defining the busy state of station 1056. The user at station 1005 depresses a feature button or enters a code defining a callback request and then returns the handset. Station 1005 transmits a CALLBACK REQUEST packet via circuit 9003 to station 1056. At some later point when station 1056 again becomes idle, station 1056 transmits a NOW IDLE packet via circuit 9003 to station 1005. In response to the NOW IDLE packet, station 1005 retransmits the SETUP packet via circuit 9003 to station 1056 and the remainder of the call proceeds as described above with respect to FIG. 17.

Figure 19:
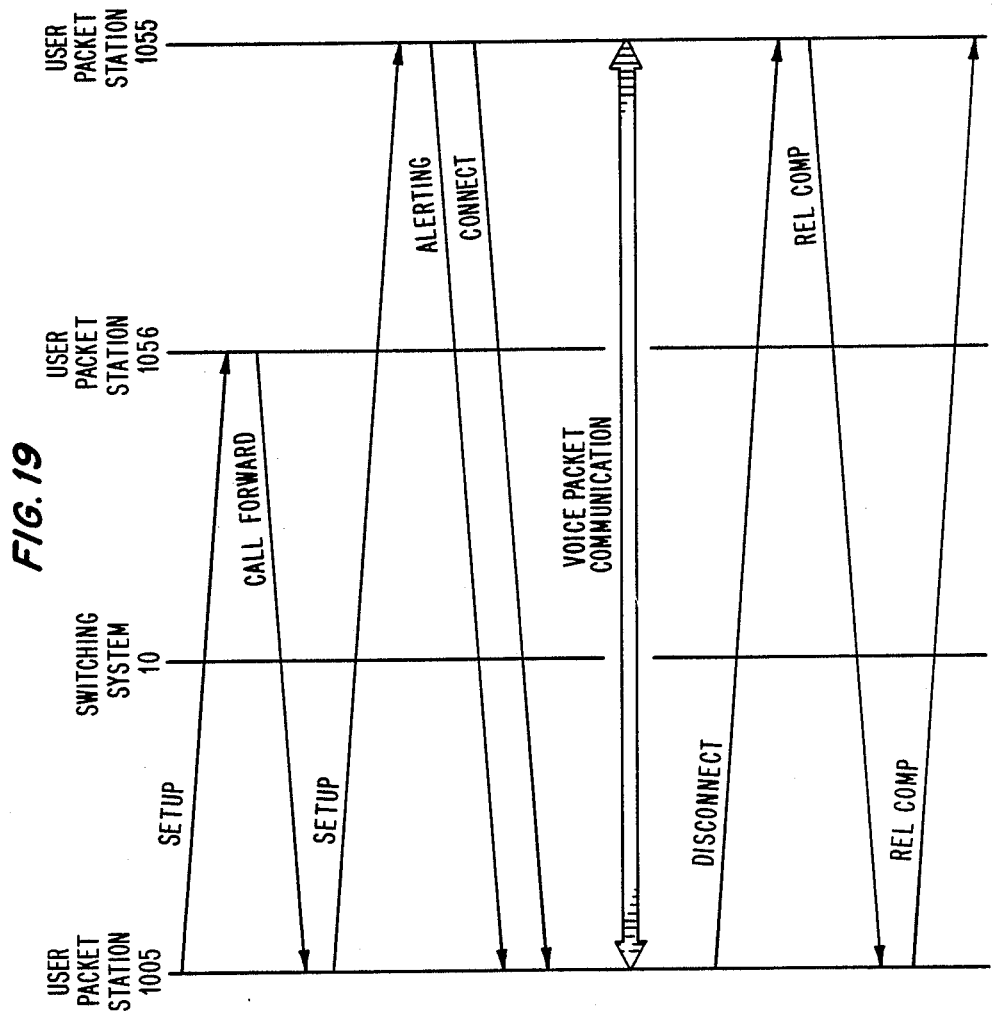

A signaling diagram for a third illustrative call is shown in FIG. 19. Station 1005 transmits an a SETUP packet via circuit 9003 to station 1056 as in FIGS. 17 and 18. However, in this case the user at station 1056 has previously activated a call forwarding feature for intra-group calls by depressing a feature button or entering a code defining call forwarding to station 1055. Therefore, station 1056 returns a CALL FWD packet via circuit 9003 to station 1005 indicating that the call is to be forwarded to station 1055. In response, station 1005 determines that station 1055 is part of its virtual PBX group and that virtual circuit 9002 has been established between station 1005 and station 1055. Accordingly, station 1005 transmits a SETUP packet via circuit 9002 to station 1055. If station 1055 is idle, the remainder of the call proceeds in the manner described above with respect to FIG. 17.

Although each of the examples illustrated the use of virtual circuits for virtual PBX group voice communication, the principles apply to the communication of data, image or other types of information as well.

Alternative Embodiment

An alternative embodiment of switching system 10 is obtained by substituting switching modules of the type illustrated by switching module 1000' (FIG. 20) for the switching modules shown in FIG. 2. Switching module 1000' differs from switching module 1000 in that packet switching unit 1400' is substituted for packet switching unit 1400 and a packet network controller 1350 is added between processor interface 1300 and packet switching unit 1400'. Packet switching unit 1400' has the capability of concurrently switching multiple packet streams.

Figure 21:
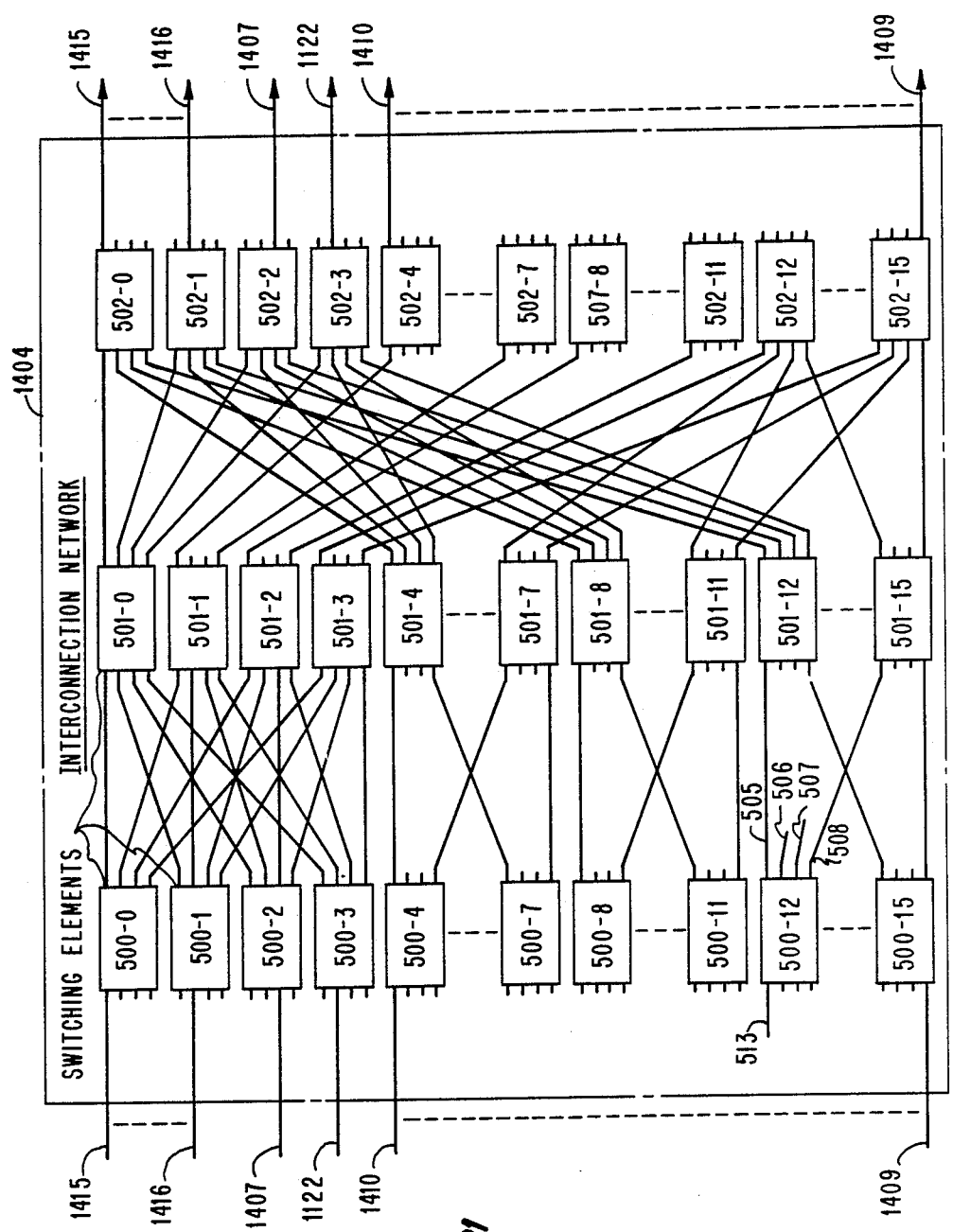
FIG. 21 is a more detailed diagram of a banyan interconnection network included in the switching module of FIG. 20.

Packet switch unit 1400' includes a self-routing, banyan interconnection network 1404 shown in more detail in FIG. 21. Network 1404 comprises three stages of switching elements. The first stage comprises switching elements 500-0 through 500-15, the second stage comprises switching elements 501-0 through 501-15, and the third stage comprises switching elements 502-0 through 502-15. Transmission through the network is from left to right. Each switching element is a packet switch. Each switching element has four inputs and is capable of buffering one packet on each input. The packets received on any input are transmittable on any of the four output terminals of the switching element. After receipt of a packet on an input terminal, the address contained in that packet is used to determine which output terminal should be used to retransmit the packet. Only the two most significant bits of the address are used to designate the output terminal for a particular switching element. For example, switching element 500-12 retransmits the packet on line 505 if the most significant bits are equal to zero, on line 506 if the most significant bits are equal to one, on line 507 if the most significant bits are equal to two, and on line 508 if the most significant bits are equal to three.

Each switching node properly rearranges the address bits so that the receiving switching element in the next stage has the correct bits in the most significant bit positions in order to determine which output terminal should be used to retransmit the packet at that stage.

Packets are conveyed between interconnection network 1404 (FIG. 20) and packet line unit 1108 and digital facility interface 1111 via a plurality of peripheral interfaces ports, e.g., ports 1401, 1402 and 1403. The peripheral interface ports receive information from the periphery at one rate, e.g., 3.072 megabits per second, and transmit this information to network 1404 at a higher rate, e.g., 8.192 megabits per second, for example via paths 1409 and 1410. Each peripheral interface port is capable of buffering multiple packets of information from the attached data bus, e.g., 1109, 1110, 1112. The buffering of packets at the input from the data buses is necessary because the packets may have to be delayed before they can be transmitted through the network. Buffering is also needed by the peripheral interface ports for information being received from network 1404. Each peripheral interface port is capable of buffering multiple packets of information from network 1404 before commencing transmission on the attached data bus. As part of the process of setting up packet-switched calls (other than the virtual PBX intra-group calls previously described), call setup signaling packets received from user packet stations in logical link LL0 are conveyed via the peripheral interface ports and interconnection network 1404 to packet network controller 1350. Such call setup packets are subsequently conveyed via processor interface 1300 to control unit 1017. To set up a packet-switched call, control unit 1017 effects the transmission of control packets by packet network controller 1350 to a particular peripheral interface port, e.g., 1402, which result in the storage of necessary routing information in port 1402 such that the logical addresses of packets subsequently received during the call are converted to physical addresses to allow the packets to properly traverse network 1404. Six network interface ports, e.g., ports 1405 and 1406, are coupled to network 1404 via paths 1415 and 1416, for example, and perform a function similar to that of the peripheral interface ports, for packets conveyed between network 1404 and TMS 2010 via data buses such as 1105 and 1106, and via circuit switching unit 1011. Recall that there are six, 3.192 megabits per second incoming packet channels on the incoming links 15 and 16 to TMS 2010 and six, 3.192 megabits per second outgoing packet channels on the outgoing links 13 and 14 from TMS 2010. Each of the network interface ports, e.g., 1405 and 1406, transmits packets on one incoming packet channel and receives packets from one outgoing packet channel.

U.S. Pat. No. 4,491,945, issued to J. S. Turner on Jan. 1, 1985 is incorporated by reference herein. Peripheral interface ports, e.g., 1402, network interface ports, e.g., 1405, and packet network controller 1350 of FIG. 20 of the present application correspond to trunk controllers 130, 131, and 129 respectively of the incorporated U.S. Pat. No. 4,491,945.

What is claimed is:

1. A switching system comprising
   a plurality of switching modules each having a plurality of access ports,
   an inter-module packet switch,
   an incoming packet channel from each of said switching modules to said inter-module packet switch, and
   an outgoing packet channel from said inter-module packet switch to each of said switching modules,
   wherein each of said switching modules comprises packet switching means for switching user information packets among said access ports of said each switching module, and between said access ports of said each switching module and said inter-module pacekt switch via said incoming and outgoing packet channels,
   wherein said inter-module packet switch comprises means for storing user information packets received on said incoming packet channels and means for concurrently packet switching user information packets, received on a plurality of said incoming packet channels and stored by said storing means, via a plurality of independent paths to a plurality of said outgoing packet channels.

2. A switching system in accordance with claim 1
   wherein said each switching module further comprises a packet line unit comprising means for statistically multiplexing packets, received from ones of said access ports of said each switching module, onto at least one incoming data bus,
   wherein said packet switching means of said each switching module provides packet-switched communication channels from said incoming data bus to at least one outgoing data bus for intra-module packet-switched communication, and from said incoming data bus to the incoming packet channel to said inter-module packet switch, and from said outgoing packet channel from said inter-module packet switch to at least one outgoing data bus for inter-module packet-switched communication, and
   wherein said packet line unit of said each switching module further comprises means for selectively transmitting packets received on at least one outgoing data bus to ones of said access ports of said each switching module.

3. In combination,
   a switching system in accordance with claim 2, and
   means for interfacing a plurality of user stations to one of said access ports.

4. A switching system in accordance with claim 1 wherein said packet switching means of said each switching module comprises
  a plurality of packet switching nodes, at least a predetermined one of said nodes coupled to the incoming and outgoing packet channels to and from said inter-module packet switch and certain ones of said nodes connected to said access ports of said each switching module, and
  packet interconnect means for interconnecting said nodes to provide packet-switched communication channels among said access ports of said each switching module and between said access ports of said each switching module and said predetermined node.

5. A switching system in accordance with claim 4,
  each of said nodes comprising means for transmitting request signals to said packet interconnect means,
  said packet interconnect means comprising means for generating selection signals each defining one of said nodes, and means responsive to a request signal from a given one of said nodes and to a generated selection signal defining said given node, for transmitting a clear signal to said given node,
  each of said nodes further comprising means responsive to a clear signal from said packet interconnect means for transmitting a packet to said packet interconnect means.

6. A switching system in accordance with claim 4 wherein said packet switching means of said each switching module further comprises
  sequencing means for sequentially enabling each of said nodes to transmit information to said packet interconnect means.

7. A switching system in accordance with claim 4 wherein said packet interconnect means comprises means for concurrently packet switching, via a plurality of independent paths to a plurality of said nodes, user information packets received from a plurality of said nodes.

8. A switching system in accordance with claim 4 wherein said packet interconnect means comprises a banyan interconnection network.

9. A switching system comprising
  a plurality of switching modules each having a plurality of access ports,
  an inter-module packet switch,
  an incoming packet channel from each of said switching modules to said inter-module packet switch, and
  an outgoing packet channel from said inter-module packet switch to each of said switching modules,
  wherein each of said switching modules comprises packet switching means for switching user information packets amoung said access ports of said each switching module, and between said access ports of said each switching module and said inter-module packet switch via said incoming and outgoing packet channels,
  wherein said inter-module packet switch comprises means for concurrently packet switching user information packets, received on a plurality of said incoming packet channels, via a plurality of independent paths to a plurality of said outgoing packet channels and wherein said inter-module packet switch comprises
  a plurality of packet buffers each for storing packets received from at least one of said incoming packet channels,
  a plurality of selectors each associated with at least one of said outgoing packet channels for selectively connecting any of said packet buffers to an outgoing packet channel associated with said each selector and
  means responsive to said stored packets for controlling the selective connections made by said selectors based on headers included in said stored packets.

10. A switching system in accordance with claim 9 wherein said controlling means comprises a plurality of selector control nodes each for controlling the selective connections made by at least one of said selectors.

11. A switching system in accordance with claim 9 wherein said inter-module packet switch further comprises
  means responsive to said stored packets for selectively effecting the transmission of said stored packets from said packet buffers.

12. A switching system in accordance with claim 11 wherein said controlling means comprises a plurality of selector control nodes each for controlling the selective connections made by at least one of said selectors and
  wherein said effecting means comprises a plurality of transmit control nodes each for effecting the transmission of packets from at least one of said packet buffers.

13. A switching system in accordance with claim 12 wherein said inter-module packet switch further comprises
  a control ring comprising said transmit control nodes and said selector control nodes and means for interconnecting said transmit control nodes and said selector control nodes for transmitting signals to said transmit control nodes and said selector control nodes defining the present connection state of ones of said packet buffers to ones of said outgoing packet channels.

14. A switching system in accordance with claim 13 wherein each of said transmit control nodes is responsive to a receipt by a packet buffer associated with said each transmit control node of a given packet, including a header defining a given one of said outgoing packet channels, and to signals transmitted by said interconnecting means defining a connection state wherein none of said packet buffers is presently connected to said given outgoing packet channel, for effecting a change of said signals transmitted by said interconnecting means to define a connection state wherein said packet buffer associated with said each transmit control node is connected to said given outgoing packet channel, and for effecting the transmission of said given packet from said packet buffer associated with said each transmit control node.

15. A switching system in accordance with claim 14 wherein each of said selector control nodes is responsive to signals transmitted by said interconnecting means defining a connection state wherein a given packet buffer is connected to an outgoing packet channel associated with said each selector control node, for controlling the connection by a selector associated with said each selector control node of said given packet buffer to said outgoing packet channel associated with said each selector control node.

16. A switching system in accordance with claim 12 wherein said inter-module packet switch further comprises a control ring comprising said transmit control nodes and said selector control nodes and means for interconnecting said transmit control nodes and said selector control nodes for transmitting signals to said transmit control nodes and said selector control nodes defining the availability of each of said outgoing packet channels for receiving packets and defining the present connection state of ones of said packet buffers to ones of said outgoing packet channels.

17. A switching system in accordance with claim 16 wherein each of said transmit control nodes is responsive to a receipt by a packet buffer associated with said each transmit control node of a given packet, including a header defining a given one of said outgoing packet channels, and to signals transmitted by said interconnecting means defining that said given outgoing packet channel is available to receive packets and defining a connection state wherein none of said packet buffers is presently connected to said given outgoing packet channel, for effecting a change of said signals transmitted by said interconnecting means to define a connection state wherein said packet buffer associated with said each transmit control node is connected to said given outgoing packet channel, and for effecting the transmission of said given packet from said packet buffer associated with said each transmit control node.

18. A switching system in accordance with claim 17 wherein each of said selector control nodes is responsive to signals transmitted by said interconnecting means defining a connection state wherein a given packet buffer is connected to an outgoing packet channel associated with said each selector control node, for controlling the connection by a selector associated with said each selector control node of said given packet buffer to said outgoing packet channel associated with said each selector control node.

19. A switching system in accordance with claim 9 further comprising a plurality of outgoing time-multiplexed links each for conveying a plurality of circuit-switched channels and at least one of said plurality of outgoing packet channels, wherein each of said outgoing packet channels comprises an outgoing packet buffer interposed between one of said selectors and one of said outgoing time-multiplexed links for storing packets received from said one of said selectors for insertion in said each outgoing packet channel conveyed on said one of said outgoing time-multiplexed links.

20. A switching system comprising a plurality of switching modules each having a plurality of access ports and an inter-module packet switch, wherein each said switching module is connected to said inter-module packet switch by at least one incoming and at least one outgoing packet channel and comprises means for statistically multiplexing packets, received from a subset of said access ports of said each switching module, onto at least one incoming data bus, packet switching means for providing packet-switched connections from said incoming data bus to at least one outgoing data bus for intra-module packet-switched communication, and from said incoming data bus to said incoming packet channel, and from said outgoing packet channel to at least one outgoing data bus for inter-module packet-switched communication, and means for selectively transmitting packets received on at least one outgoing data bus to said subset of said access ports, and wherein said inter-module packet switch comprises a plurality of packet buffers for storing packets received from the packet switching means of said switching modules via said incoming packet channels, and means for controlling the transmission of packets from said packet buffers to the packet switching means of said switching modules via said outgoing packet channels.

21. A switching system comprising a plurality of switching module measn each having a plurality of access ports and for switching user information packets between said access ports and for switching user information packets between said access ports, and a packet switch comprising means for storing user information packets, receivable from a plurality of said switching modules, and means for concurrently packet switching said user information packets via independent paths to opens of said switching modules defined by said user information packets.

22. A switching system comprising a plurality of switching modules each having a plurality of access ports, an inter-module packet switch, an incoming packet channel from each of said switching modules to said inter-module packet switch, and an outgoing packet channel from said inter-module packet switch to each of said switching modules, wherein each of said switching modules comprises packet switching means for switching user information packets among said access ports of said each switching module, and between said access ports of said each switching module and said inter-module packet switch via aid incoming and outgoing packet channels, wherein said inter-module packet switch comprises means for concurrently packet switching user information packets, received on a plurality of said incoming packet channels, via a plurality of independent paths to a plurality of said outgoing packet channels, wherein said each switching module further comprises a packet line unit comprising means for statistically multiplexing packets, received from ones of said access ports of said each switching module, onto at least one incoming data bus, wherein said packet switching means of said each switching module provides packet-switched communication channels from said incoming data bus to at least one outgoing data bus for intra-module packet-switched communication, and from said incoming data bus to the incoming packet channel to said inter-module packet switch, and from said outgoing packet channel from said inter-module packet switch to at least one outgoing data bus for inter-module packet-switched communication, and wherein said packet line unit of said each switching module further comprises means for selectively transmitting packets received on at least one outgoing data bus to ones of said access ports of said each switching module.

23. In combination, a switching system in accordance with claim 22, and means for interfacing a plurality of user stations to one of said access ports.

24. A switching system comprising a plurality of switching modules each having a plurality of access ports, an inter-module packet switch, an incoming packet channel from each of said switching modules to said inter-module packet switch, and an outgoing packet channel from said inter-module packet switch to each of said switching modules, wherein each of said switching modules comprises packet switching means for switching user information packets among said access ports of said each switching module, and between said access ports of said each switching module and said inter-module packet switch via said incoming and outgoing packet channels, wherein said inter-module packet switch comprises means for concurrently packet switching user information packets, received on a plurality of said incoming packet channels, via a plurality of independent paths to a plurality of said outgoing packet channels, wherein said packet switching means of said each switching module comprises a plurality of packet switching nodes, at least a predetermined one of said nodes coupled to the incoming and outgoing packet channels to and from said inter-module packet switch and cetain ones of said nodes connected to said access ports of said each switching module, and packet interconnect means for interconnecting said nodes to provide packet-switched communication channels amoung said access ports of said each switching module and between said access ports of said each switching module and said predetermined node, each of said nodes comprising means for transmitting request signals to said packet interconnect means, said packet interconnect means comprising means for generating selection signals each defining one of said nodes, and means responsive to a request signal from a given one of said nodes and to a generated selection signal defining said given node, for transmitting a clear signal to said given node, each of said nodes further comprising means responsive to a clear signal from said packet interconenct means for transmitting a packet to said packet interconnect means.

25. A switching system comprising a plurality of switching modules each having a plurality of access ports, an inter-module packet switch, an incoming packet channel from each of said switching modules to said inter-module packet switch, and an outgoing packet channel from said inter-module packet switch to each of said switching modules, wherein each of said switching modules comprises packet switching means for switching user information packets among said access ports of said each switching module, and between said access ports of said each switching module and said inter-module packet switch via said incoming and outgoing packet channels, wherein said inter-module packet switch comprises means for concurrently packet switching user information packets, received on a plurality of said incoming packet channels, via a plurality of independent paths to a plurality of said outgoing packet channels, wherein said packet switching means of said each switching module comprises a plurality of packet switching nodes, at least a predetermined one of said nodes coupled to the incoming and outgoing packet channels to and from said inter-module packet switch and certain ones of said nodes connected to said access ports of said each switching module, and packet interconnect means for interconnecting said nodes to provide packet-switched communication channels among said access ports of said each switching module and between said access ports of said each switching module and said predetermined node, wherein said packet switching means of said each switching module further comprises sequencing means for sequentially enabling each of said nodes to transmit information to said packet interconnect means.

26. A switching system comprising a plurality of switching modules each having a plurality of access ports, an inter-module packet switch, an incoming packet channel from each of said switching modules to said inter-module packet switch, and an outgoing packet channel from said inter-module packet switch to each of said switching modules, wherein each of said switching modules comprises packet switching means for switching user information packets amoung said access ports of said each switching module, and between said access ports of said each switching module and said inter-module packet switch via said incoming and outgoing packet channels, wherein said inter-module packet switch comprises means for concurrently packet switching user information packets, received on a plurality of said incoming packet channels, via a plurality of independent paths to a plurality of said outgoing packet channels, wherein said packet switching means of said each switching module comprises a plurality of packet switching nodes, at least a predetermined one of said nodes coupled to the incoming and outgoing packet channels to and from said inter-module packet switch and certain ones of said nodes connected to said access ports of said each switching module, and packet interconnect means for interconnecting said nodes to provide packet-switched communication channels among said access ports of said each switching module and between said access ports of said each switching module and said predetermined node, wherein said packet interconnect means comprises means for concurrently packet switching, via a plurality of independent paths to a plurality of said nodes, user information packets received from a plurality of said nodes.

27. A switching system comprising a plurality of switching modules each having a plurality of access ports, an inter-module packet switch, an incoming packet channel from each of said switching modules to said inter-module packet switch, and an outgoing packet channel from said inter-module packet switch to each of said switching modules, wherein each of said switching modules comprises packet switching means for switching user information packets among said access port of said each switching module, and between said access ports of said each switching module and said inter-module packet switch via said incoming and outgoing packet channels, wherein said inter-module packet switch comprises means for concurrently packet switching user information packets, received on a plurality of said incoming packet channels, via a plurality of independent paths to a plurality of said outgoing packet channels, wherein said packet switching means of said each switching module comprises a plurality of packet switching nodes, at least a predetermined one of said nodes coupled to the incoming and outgoing packet channels to and from said inter-module packet switch and certain ones of said nodes connected to said access ports of said each switching module, and packet interconnect means for interconnecting said nodes to provide packet-switched communication channels amoung said access ports of said each switching module and between said access ports of said each switching module and said predetermined node, wherein said packet interconnect means comprises a banyan interconnection network.

* * * * *